United States Patent
Lau et al.

(10) Patent No.: US 10,129,356 B2
(45) Date of Patent: Nov. 13, 2018

(54) PHYSICAL LAYER CACHING FOR FLEXIBLE MIMO COOPERATION IN WIRELESS NETWORKS

(71) Applicant: The Hong Kong University of Science and Technology, Kowloon (HK)

(72) Inventors: Vincent Kin Nang Lau, New Territories (HK); An Liu, New Territories (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 333 days.

(21) Appl. No.: 14/542,465

(22) Filed: Nov. 14, 2014

(65) Prior Publication Data

US 2015/0142914 A1  May 21, 2015

Related U.S. Application Data

(60) Provisional application No. 61/962,763, filed on Nov. 15, 2013, provisional application No. 61/962,762, filed on Nov. 15, 2013.

(51) Int. Cl.
| | |
|---|---|
| *G06F 15/16* | (2006.01) |
| *H04L 29/08* | (2006.01) |
| *H04B 7/024* | (2017.01) |

(52) U.S. Cl.
CPC ......... *H04L 67/2842* (2013.01); *H04B 7/024* (2013.01)

(58) Field of Classification Search
CPC ................................ H04L 65/80; H04L 45/16
See application file for complete search history.

(56) References Cited

U.S. PATENT DOCUMENTS

| | | | |
|---|---|---|---|
| 7,117,262 B2 | 10/2006 | Bai et al. | |
| 7,633,923 B2 * | 12/2009 | Gorokhov | H04L 1/0041 370/343 |
| 8,108,620 B2 | 1/2012 | Anderson et al. | |
| 8,503,370 B2 * | 8/2013 | Klein | H04W 4/00 370/328 |

(Continued)

FOREIGN PATENT DOCUMENTS

| | | |
|---|---|---|
| CN | 103686860 A | 3/2014 |
| EP | 2311200 A2 | 4/2011 |

(Continued)

OTHER PUBLICATIONS

Yin, et al. "Supporting Cooperative Caching in Adhoc Network". IEEE Transactions on mobile computing, vol. 5, No. 1, Jan. 2006. 13 pages.

(Continued)

*Primary Examiner* — Hamza N Algibhah
*Assistant Examiner* — Tesfu N Mekonen
(74) *Attorney, Agent, or Firm* — Amin, Turocy & Watson, LLP

(57) ABSTRACT

Cooperative physical layer caching systems for base stations are described herein. Base stations include cache memories that store portions of content. Base stations receive requests for content files from mobile devices. Cooperative physical layer caching systems can determine contents of the cache memories and can coordinate physical transmissions of the content files based on the contents of the cache memories.

19 Claims, 15 Drawing Sheets

(56) References Cited

U.S. PATENT DOCUMENTS

| | | | | |
|---|---|---|---|---|
| 8,509,288 | B2* | 8/2013 | Erkip | H04L 25/20 178/70 R |
| 8,611,822 | B2 | 12/2013 | Yavuz et al. | |
| 8,694,545 | B2* | 4/2014 | Leggette | H04L 65/4084 707/793 |
| 8,862,814 | B2* | 10/2014 | Chetlur | H04L 67/2842 711/113 |
| 9,270,410 | B2* | 2/2016 | Onggosanusi | H04B 7/0691 |
| 2008/0310365 | A1 | 12/2008 | Ergen et al. | |
| 2009/0135944 | A1 | 5/2009 | Dyer et al. | |
| 2010/0162078 | A1* | 6/2010 | Miller | H04L 1/0003 714/755 |
| 2010/0273468 | A1 | 10/2010 | Bienas et al. | |
| 2011/0110414 | A1* | 5/2011 | Papadogiannis | H04B 7/0417 375/227 |
| 2012/0110113 | A1 | 5/2012 | Lee et al. | |
| 2012/0231739 | A1 | 9/2012 | Chen et al. | |
| 2014/0153504 | A1* | 6/2014 | Wang | H04W 28/14 370/329 |
| 2014/0185606 | A1 | 7/2014 | Wei | |
| 2014/0201311 | A1 | 7/2014 | Lau | |
| 2014/0229563 | A1 | 8/2014 | Kang et al. | |
| 2015/0003234 | A1* | 1/2015 | Samardzija | H04L 67/2847 370/229 |
| 2015/0281973 | A1* | 10/2015 | Svedman | H04B 7/0691 455/454 |

FOREIGN PATENT DOCUMENTS

| | | |
|---|---|---|
| EP | 2505009 A1 | 10/2012 |
| KR | 20130087810 A | 8/2013 |
| WO | 2013152820 A1 | 10/2013 |

OTHER PUBLICATIONS

Cao, et al., "Cooperative Cache-Based Data Access in Adhoc Network". Published by the IEEE Computer Society, Feb. 2004. 8 pages.

Herrero, et al., "Distributed Cooperative Caching", PACT'08, Oct. 25-29, 2008, Toronto, Ontario, Canada. 10 pages.

Chow, et al. "Peer-to-Peer Cooperative Caching in Mobile Environments". Proceedings of the 24th International Conference on Distributed Computing Systems Workshops (ICDCSW'04), Mar. 2004, 6 pages.

Annapureddy, et al., "Shark: Scaling File Servers via Cooperative Caching". Proceedings of the 2nd conference on Symposium on Networked Systems Design & Implementation—vol. 2, May 2005, 14 pages.

Anderson, et al., "New Algorithms for File System Cooperative Caching". 2010 18th Annual IEEE/ACM International Symposium on Modeling, Analysis and Simulation of Computer and Telecommunication Systems. Aug. 2010. 4 pages.

Ming, et al. "Age-Based cooperative Caching in Information-Centric networks". IEEE INFOCOM 2012 Workshop on Emerging Design Choices in Name-Oriented Networking. Mar. 2012, 6 pages.

"Cooperative Caching using Hash Routing". University of California—San Diego. Published online at [https://cseweb.ucsd.edu/classes/wi00/cse291/slides/hash-cache.pdf]. Retrieved on Oct. 16, 2014, 13 pages.

Chowdhery, et al, "Cooperative wireless multicell OFDMA network with backhaul capacity constraints". Proceedings 2011 IEEE International Conference on Communications (ICC), Jun. 2011. 6 pages.

Ioannidis, et al., "Distributed Caching over Heterogeneous Mobile Networks". SIGMETRICS'10, Jun. 14-18, 2010, New York, USA, 12 pages.

Liu, et al., "A 25 Gb/s(/km2) urban wireless network beyond IMT-advanced". IEEE Communications Magazine, Feb. 2011, 8 pages.

Golrezaei, et al. "FemtoCaching: Wireless video content delivery through distributed caching helpers". Proceedings IEEE INFOCOM, Mar. 2012, 9 pages.

Liu, et al. "Cache-induced opportunistic MIMO cooperation: A new paradigm for future wireless content access networks". IEEE International Symposium on Information Theory. Jun. 29, 2014-Jul. 4, 2014. 5 pages.

Golrezaei, et al. "Femtocaching and device-to-device collaboration: A new architecture for wireless video distribution". IEEE Communications Magazine, Apr. 2013, 8 pages.

Ji, et al., "Wireless Device-to-Device Caching Networks: Basic Principles and System Performance". Apr. 24, 2014. Revised version of the manuscript submitted to IEEE Journal on Selected Areas in Communications, Special Issue on Device to Device Communications in Cellular Networks. Published online at [http://arxiv.org/abs/1305.5216], Retrieved on Feb. 12, 2015, 35 pages.

Karger, et al. "Web caching with consistent hashing", Computer Networks 31, published by Elsevier Science B.V., 1999, pp. 1203-1213.

"Wireless Telecommunications Carriers in the US Market Research" IBISWorld. Published online at [http://www.ibisworld.com/industry/default.aspx?indid=1267], retrieved on Mar. 13, 2015, 2 pages.

"Telecommunications Equipment Manufacturing Industry Profile" First Research. Published online at [http://www.firstresearch.com/Industry-Research/Telecommunications-Equipment-Manufacturing.html], retrieved on Mar. 13, 2015, 1 page.

"Global Wireless Telecommunications Carriers Market Research" IBISWorld. Published online at [http://www.ibisworld.com/industry/global/global-wireless-telecommunications-carriers.html], retrieved on Mar. 13, 2015, 2 pages.

"Telecommunications Industry Market Research" Plunkett Research Ltd. Published online at [http://www.plunkettresearch.com/industries/telecommunications-market-research/], retrieved on Mar. 13, 2015, 6 pages.

"The 2G, 3G and 4G Wireless Network Infrastructure Market: 2014-2020—with an Evaluation of WiFi and WiMAX Signals and Systems Telecom" Jan. 14, 2014. Published online at [http://4g-market.com/reports/the-2g-3g-and-4g-wireless-network-infrastructure-market-2014-2020-with-an-evaluation-of-wifi-and-wimax/], retrieved on Mar. 13, 2015, 23 pages.

"Global Heterogeneous Networks Market 2014-2018" TechNavio. Dec. 4, 2013. Published online at [http://4g-market.com/reports/global-heterogeneous-networks-market-2014-2018/], retrieved on Mar. 13, 2015, 5 pages.

"Global Carrier Wi-Fi Equipment Market 2012-2016" TechNavio. Sep. 27, 2013. Published online at[http://4g-market.com/reports/global-carrier-wi-fi-equipment-market-2012-2016/], retrieved on Mar. 13, 2015, 5 pages.

"Backhaul" Ruckus Wireless, Inc. Published online at [http://www.ruckuswireless.com/carriers/backhaul], retrieved on Mar. 13, 2015, 3 pages.

"Point-to-Multipoint / Wireless Broadband" Proxim Wireless. Published online at [http://www.proxim.com/products], retrieved on Mar. 13, 2015, 7 pages.

"Wireless Backhaul" Cyan. Published online at [http://www.cyaninc.com/solutions/use-case/wireless-backhaul-tower], retrieved on Mar. 13, 2015, 2 pages.

"Mobility Backhaul" SkyFiber, Inc. Published online at [http://www.skyfiber.com/solutions_mbon.php], retrieved on Mar. 13, 2015, 2 pages.

"IP Mobile Backhaul" Aviat Networks. Published online at [http://www.aviatnetworks.com/solutions/mobile/ip-mobile-backhaul/], retrieved on Mar. 13, 2015, 2 pages.

"Overview of the X-1200 Wireless Backhaul System" BLiNQ Networks. Published online at [http://www.blinqnetworks.com/products], retrieved on Mar. 13, 2015, 5 pages.

* cited by examiner

PHYSICAL LAYER CACHING FOR FLEXIBLE MIMO COOPERATION IN WIRELESS NETWORKS

CROSS REFERENCE TO RELATED APPLICATION

This application claims priority to U.S. Provisional Application No. 61/962,763, filed on Nov. 15, 2013, entitled: "Exploiting BS Caching in Heterogeneous Wireless Networks," and U.S. Provisional Application No. 61/962,762, filed on Nov. 15, 2013, entitled: "Cached-Induced Asymmetric MIMO Cooperation for Wireless Networks." The entireties of these provisional applications are hereby incorporated herein by reference.

TECHNICAL FIELD

This disclosure generally relates to wireless networks, e.g., physical layer caching for flexible MIMO cooperation in wireless networks with reduced backhaul consumption and related embodiments.

BACKGROUND

Wireless service providers are observing an exponential growth in mobile communications due to both an increase in consumer demand and commercial requirements. To ensure customer satisfaction, wireless service providers aim to deliver a high quality service at any location, to facilitate reliable and efficient mobile communications. Consumers can access a growing number of networks using a mobile device. These networks include, for example, 3G networks, 4G networks, long term evolution networks and Wi-Fi networks. These networks allow consumers to communicate voice, text, multimedia, and other data to and from other network entities, such as servers and other mobile devices.

The number of consumers accessing these networks and the amount of bandwidth used by consumers are rapidly increasing. With this rapid increase, mobile traffic is also increasing along the networks placing strain on networks and network resources. The strain can result in a bottleneck restricting data flow, such as at a cellular base station. When networks are strained, consumers can experience a diminished quality of service and become frustrated.

In traditional communications using wireless relays, one or more relays are deployed to help the communications between a source and destinations. However, due to a cut-set bound of wireless networks, a capacity of such relay systems is limited by the communication links from the source to the relay and the destinations.

On the other hand, the capacity can be increased in heterogeneous networks by deploying a large number of pico base stations. With high-speed backhaul links for the pico base stations, a system capacity is proportional to the number of pico base stations per unit area. However, the high-speed backhaul links are very expensive, and the heterogeneous network solution is not cost-effective as the number of pico base stations increases.

The above-described background is merely intended to provide an overview of contextual information regarding networks, and is not intended to be exhaustive. Additional context may become apparent upon review of one or more of the various non-limiting embodiments of the following detailed description.

BRIEF DESCRIPTION OF THE DRAWINGS

Numerous aspects and embodiments are set forth in the following detailed description, taken in conjunction with the accompanying drawings, in which like reference characters refer to like parts throughout, and in which.

DETAILED DESCRIPTION

Figure 1:
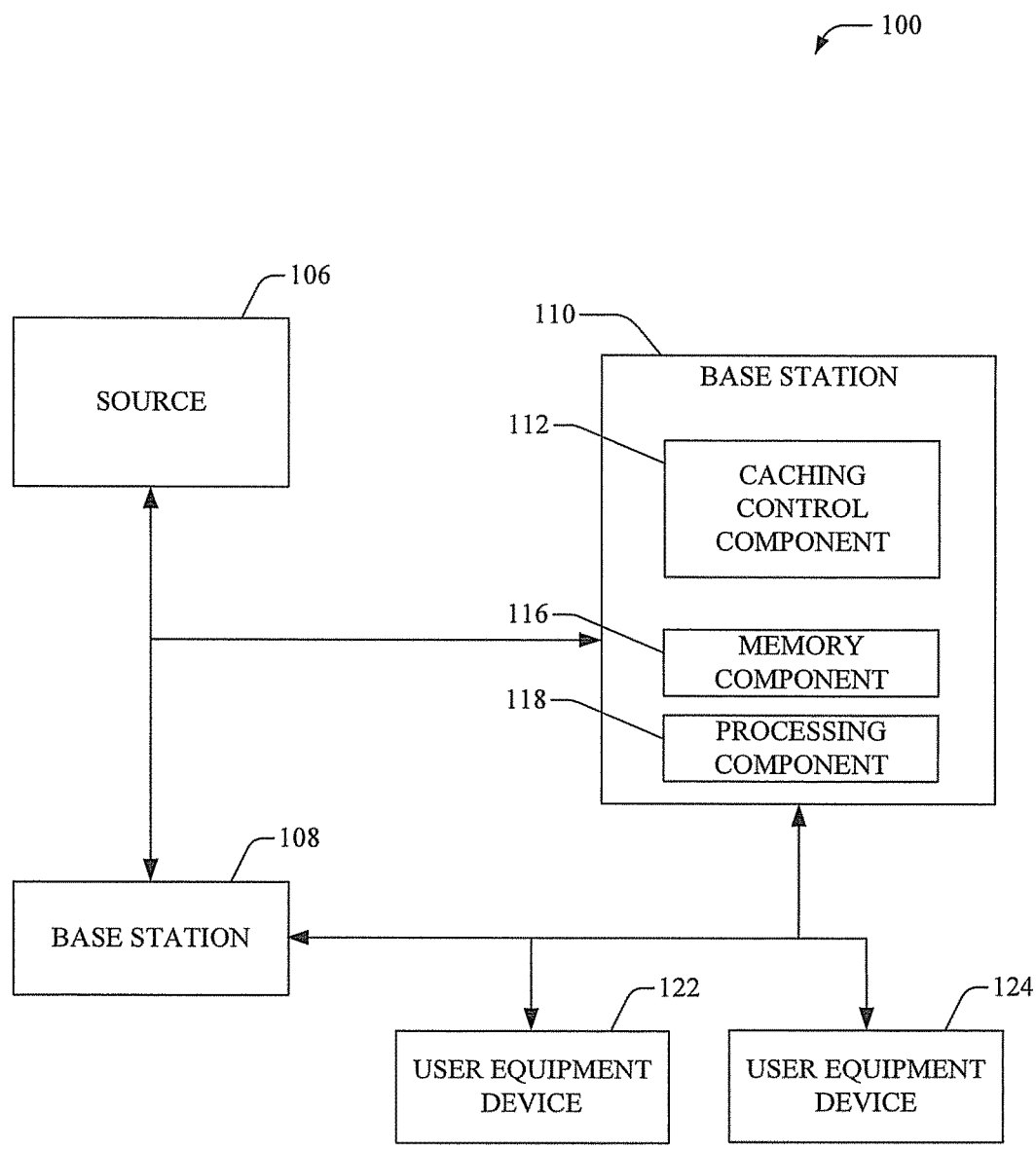
FIG. 1 is an example functional high level block diagram of a system that can facilitate cooperative physical layer caching and transmissions in a networked environment, according to an aspect or embodiment of the subject disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that the certain aspects of disclosure may be practiced without these specific details, or with other methods, components, molecules, etc. In other instances, well-known structures and devices are shown in block diagram form to facilitate description and illustration of the various embodiments. Additionally, elements in the drawing figures are not necessarily drawn to scale; some areas or elements may be expanded to help improve understanding of certain aspects or embodiments.

The terms "access point," "server," "base server," (BS) and the like, are utilized interchangeably in the subject application, and refer to a network component or appliance that serves and receives data, control, voice, video, sound, gaming, or substantially any data-stream or signaling-stream from a set of subscriber stations. Data and signaling streams can be packetized or frame-based flows. Furthermore, the terms "user," "subscriber," "customer," "consumer," and the like are employed interchangeably throughout the subject specification, unless context warrants particular distinction(s) among the terms. It should be noted that such terms can refer to human entities or automated components supported through artificial intelligence (e.g., a capacity to make inferences based on complex mathematical formalisms), which can provide simulated vision, sound recognition and so forth.

It is noted that, terms "user equipment," "device," "user equipment device," "client," and the like are utilized interchangeably in the subject application, unless context warrants particular distinction(s) among the terms. Such terms can refer to network component(s) or appliance(s) that servers and receives data, voice, video, sound, games, or substantially any data-stream or signaling-stream to or from network components and/or other devices. By way of example, a user equipment device and the like, as used herein and throughout this disclosure, can comprise a mobile device such as an electronic device capable of wirelessly sending and receiving data. A user equipment device may have a processor, a memory, a transceiver, an input, and an output. Examples of such devices include cellular telephones, personal digital assistants, portable computers, tablet computers, handheld gaming consoles, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

Furthermore, the terms "real-time," "near real-time," "dynamically," "instantaneous," "continuously," and the like are employed interchangeably or similarly throughout the subject specification, unless context warrants particular distinction(s) among the terms. It should be noted that such terms can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

Aspects or features of the subject specification can be exploited in substantially any radio access network employing respective radio access technologies, e.g., Wi-Fi, global system for mobile communications, universal mobile telecommunications system, worldwide interoperability for microwave access, enhanced general packet radio service, third generation partnership project long term evolution, fourth generation long term evolution, third generation partnership project 2, ultra mobile broadband, high speed packet access, Zigbee, $x^{th}$ generation, long term evolution, or another IEEE 802.XX technology. Additionally, substantially all aspects of the subject specification can be exploited in legacy telecommunication technologies.

The systems and methods disclosed herein, in one aspect thereof, can steer user traffic along a number of networks based on contents of base stations' caches of the networks. A cellular broadcast channel, Wi-Fi channel and the like can send information to a user device to enable cooperative transmissions (e.g., via universal mobile telecommunications system, long term evolution, Wi-Fi, etc.) for delivering and receiving communications of a user device. In another example, a base station can alter a cache of the base station based on data associated with statistics of access requests. For instance, a base station can select content files for storage in the cache based on popularity metrics associated with the content files. The base station can determine an amount of data to store for selected content files based on the popularity of the content files.

Heterogeneous networks (HetNet) consist of a diverse set of base stations. The base stations can be associated with different performance metrics or characteristics. For example, regular macro base stations can comprise high powered base stations that typically have high cost backhaul connections to a central server. In contrast, lower powered pico base stations are often overlaid within a network of macro base stations. Pico base stations also have high cost backhaul connections to a central server. Moreover, pico base stations generally have smaller coverage areas compared to macro base stations. Pico base stations are generally deployed in high traffic areas to offload traffic from macro base stations. Such a base station deployment essentially brings the network closer to mobile users and thus can significantly improve spectral efficiency per unit area by increasing the number of pico base stations. However, the HetNet requires additional expensive high-speed backhaul for the pico base stations, which makes it a high cost solution.

In some systems utilizing cooperative many-in-many-out (MIMO) communications, base stations must have a copy of payload data for all users associated with the base stations. Such systems assume information is random raw data and are designed to maximize the capacity (flow of the raw information bits per unit time). Embodiments described herein, may be associated with delivering content (e.g., content files, media files, etc.) rather than delivering random raw information bits, but may also be utilized to deliver such random raw information bits. There is a subtle but extremely important difference between content files and random or raw information bits. This difference is that the content files may be "cachable".

The capacity demands in wireless networks are increasingly resulting from video or multimedia streaming applications. Many different users often request the popular video or media files, such as newly released videos on a media streaming service. Hence, these content files can be cached or partially cached at base stations. Storing the content files or representations of content files can reduce backhaul consumption and create cooperative MIMO opportunities.

In at least one embodiment, pico base stations that have large storage capacity, but low-cost backhaul (e.g., wireless backhaul) connections to a cellular network (e.g., a server) are deployed in a network. The pico base stations are configured to store data associated with content files in cache storage. By exploiting the fact that content files are cachable, a large portion of the backhaul communications can be replaced via caching schemes described herein. As a result, the described base station caching schemes can significantly decrease the backhaul cost associated with a network.

In embodiments, a system can utilize cache-induced asymmetric MIMO cooperation. In asymmetric MIMO cooperation, each cooperative base station may store only a portion of payload data or all payload data of an associated user. Storing only a portion of payload data can provide more flexibility and opportunity to reduce backhaul traffic. Furthermore, base station level caching is exploited to realize MIMO cooperation for media streaming applications with significantly reduced backhaul consumption. Specifically, each base station caches a portion of the multimedia files. If the payload data accessed by each user exists in the cache of several adjacent Base stations simultaneously, these base stations can engage in MIMO cooperation without payload backhaul consumption.

In various embodiments, a source (e.g., a server) can provide content to network devices, such as a base station (BS) device or access point. Mobile devices can connect to BS devices to send and receive data. For instance, the mobile devices can connect to a macro or pico base station and request a content file from a network. The base station can provide the content such as through transmittable data (e.g., packets). The transmittable data can be pushed to a user equipment device. In an aspect, a cooperative control component can determine whether data for servicing the request is stored in a cache of the base station and/or stored in a cache of neighboring base stations. Based on content of the caches, cooperative control component 110 can facilitate communication of the content to the mobile device. In some embodiments, the cooperative control component can utilize cooperative MIMO (Co-MIMO) schemes to facilitate communication of the content from several base stations to several mobile devices. For example, the cooperative control component can determine transmission paths (e.g., via backhauls, caches, etc.) and/or select base stations for transmissions.

A caching control component can control contents of cache memories of base station devices. For instance, the caching control component can determine whether to store data associated with a content file. In embodiments, the caching control component can determine how much data to store for content files selected for storage. Determining how much data to store can be based on a size of a cache, a popularity metric of a content file, or the like.

In another aspect, when a caching control component determines that a content file is not stored in a cache, the caching control component can select base stations for transmissions based in part on characteristics of a network. For example, the caching control component can select base stations for various transmissions based on characteristics of backhaul connections, network traffic, and the like. Hence, there is a Co-MIMO caching gain due to the caching enabled cooperative MIMO transmission.

In another embodiment, a network statistic collection agent can gather information pertaining to a network. The information can include network characteristics, performance metrics (e.g., bandwidth utilization, load, etc.), requested packets, identifiable content access patterns (e.g., popularity metrics), and the like. The information can be processed to generate caching policy.

"Logic" as used herein and throughout this disclosure, refers to any information having the form of instruction signals and/or data that may be applied to direct the operation of a processor. Logic may be formed from signals stored in a memory device. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network is preferably packet-based; however, radio and frequency/amplitude modulations networks can enable communication between communication devices using appropriate analog-digital-analog converters and other elements. Communication is enabled by hardware elements called "transceivers." User equipment devices can have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A Wi-Fi network is accessible via "access points" such as wireless routers, etc., that communicate with the Wi-Fi transceiver to send and receive data. The Wi-Fi network can further be connected to the internet or other packet-based networks. The "bandwidth" of a network connection or an access point is a measure of the rate of data transfer, and can be expressed as a quantity of data transferred per unit of time. Additionally, communication (e.g., voice and/or data traffic) between one or more components can include, wired communications (routed through a backhaul broadband wired network, an optical fiber backbone, twisted-pair line, T1/E1 phone line, digital subscriber line, coaxial cable, and/or the like), and or radio broadcasts (e.g., cellular channels, Wi-Fi channels, satellite channels, and/or the like).

A network, as used herein, typically includes a plurality of elements that host logic for performing tasks on the network. The logic can be hosted on servers. In modern packet-based wide-area networks, servers may be placed at several logical points on the network. Servers may further be in communication with databases and can enable communication devices to access the contents of a database. Billing servers, application servers, etc. are examples of such servers. A server can include several network elements, including other servers, and can be logically situation anywhere on a service provider's network, such as the back-end of a cellular network.

Various implementations described herein provide cooperative caching for networks, such as wireless networks, MIMO networks, and the like. The implementations can provide cooperative data transmissions to end users, increased efficiency, increased bandwidth, decreased delay times (e.g., round-trip delay times), decreased backhaul consumption, reduced cost and the like.

FIG. 1 is an example functional high level block diagram of a system 100 that facilitates cooperative physical layer transmissions in a communication network. It is noted that the system 100 can be various other types of networks, including cellular systems, heterogeneous netoworks and WiFi networks. While the various components are illustrated as separate components, it is noted that the various components can be comprised in one or more other components. Further, it is noted that the system 100 can comprise additional components not shown for readability. Additionally, various aspects described herein may be performed by one device or on a number of devices in communication with each other. It is further noted that system 100 can be within larger networked environments.

In implementations, system 100 can comprise a source 106, a base station 108, a base station 110, and user equipment device(s) 122. In implementations, source 106, base station 108, base station 110, user equipment device 122, and user equipment device 124 can communicate through wireless channels. In an aspect, base station 110 can have a wireless backhaul or low cost wired backhaul connection with base station 108. In another aspect, base station 110 communicates control signaling with base station 108. Source 106 can comprise content and supply (or source) the content to the various components, such as media (video data, image data, audio data, etc.). In an aspect, source 106 can comprise a server (e.g., video on demand server), a data store, or the like. Source 106 can supply content to a user equipment device through various network components such as base station 108, base station 110, etc. It is noted that source 106 can comprise one or more devices, such as a database, server, gateways, interconnection devices, and the like.

Base station 110 can include caching control component 112, memory component 116, and processing component 118. Memory component 116 can comprise one or more memory devices, such as a cache memory device. It is noted that memory component 116 can comprise various types of non-transitory computer readable storage devices. Further, processing component 118 can comprise a computer processor or the like. In an aspect, memory component 116 can store computer executable components, such as caching component 112. In another aspect, processing component 118 can execute the components. It is noted that each base station in a network can comprise cache a control component, a memory and a processor. While depicted with base station 110, it is also noted that various other devices (e.g., base station 108, source 106, etc.) can comprise caching control component 112. It is further noted that caching control component 112 can be span multiple devices (e.g., base station 110, base station 108, etc.).

User equipment device 122 can comprise various devices such as smart phones, tablets, e-readers, digital video recorders, mobile music players, personal computers, servers, memory sticks, digital video recorders (DVRs), consumer electronics, and the like. In an aspect, a user can utilize user equipment device 122 to access content in a network (e.g., content stored in source 106 and/or cached in base station 110). For example, a user can utilize a media application executed at least in part by user equipment device 112. User equipment can communicate a signal to a network device (e.g., base station 108, base station 110, and/or source 106). The signal can comprise data representing a request to access content. It is noted that user equipment device 122 can communicate the signal to one or more of the network devices. It is further noted that user equipment device 112 can be configured to send a signal to only one device at a time (e.g., base station 108).

In an implementation, base station 108 can receive a signal requesting content (e.g., a packet of data) sent from user equipment device 122. Base station 108 can determine whether base station 110 contains the requested content and/or a copy of the requested content in memory component 116. In an aspect, base station 108 can determine whether a cache of base station 108 contains the requested content and/or a copy of the requested content. In embodiments, each base station 108/110 and/or source 106 can maintain a content list storing data indicating contents of various memory components, such as a content list of their own memory and a content list of other devices' memory. In another embodiment, the various network devices (e.g., base station 108, base station 110, source 106, etc.) can query other network devices to determine whether the requested contents are in memory components of the other network devices. For example, base station 108 can query base station 110 to determine if requested content is in memory component 116. It is noted that base station 108 can determine whether base station 110 contains the requested content in various other manners (e.g., through source 106, etc.).

In an aspect, base station 110 can cache content in memory component 116. Content can comprise data such as media or representations of media. In an aspect, content can be in the form of packets. It is noted that base station 110 can cache a set of related packets, such as a set of packets defining a single transferable item (e.g., a video, an audio track, etc.). Memory component 116 can store the content in various storage containers, such as tables, queues, etc. As used herein, memory component 116 can be considered a cache memory that caches content of source 106. It is noted that memory component 116 can cache content stored in various other network components. Further, in implementations various base stations, user equipment devices, or other device can function as source 106.

In implementations, memory component 116 can store statistical data, such as data describing a history of access and/or requests to content, data describing transmission control metrics (e.g., dropped packets, received packets, etc.), data describing items stored in memory component 116, and data describing various other aspects of system 100 (e.g., number of users, network performance, bandwidth provided to users, etc.). It is noted that, network components, such as base station 110, base station 108, and source 106, can monitor data defining network statistics and communicated updated data to memory component 116.

Caching control component 112 can manage (e.g., control) memory component 116 and determine a caching strategy such as what to cache and when to cache. In an aspect, caching control component 112 can determine to store a particular item, remove an item, add an item, how to represent an item, and the like. In another aspect, caching control component 112 can manage memory component 116 based on a caching scheme, a size of a cache, and/or statistical data. In implementations, caching schemes can be based on a popularity metric. Caching control component 112 can determine popularity based on statistical data. For example, a caching control component 112 can store items having a higher relative popularity as determined based on a number of accesses and/or requests. It is noted that popularity can be based on a period of time. In an aspect, caching control component 112 can determine popularity based on a defined period (e.g., an hour, a week, etc.). It is noted that caching control component 112 can determine popularity according to various schemes in addition to or in place of a number of accesses and/or requests. For example, caching control component 112 can cache items based on data defining a projected popularity metric. In a video on demand (VOD) system caching control component 112 can utilize box office attendance, media coverage, date of release, user input, social media mentions, and the like to determine popularity. For example, a video not yet released may not have any prior accesses and/or requests, but can have a relatively high projected popularity. In another example, a particular video file may have a higher demand during nights or weekends, while having a lower demand during business hours. Caching control component 112 can schedule automatic cache updates based on determining a pattern of access, such that the particular video file (or representation thereof) is stored in a cache during times when it is projected to be of higher popularity or demand.

In another aspect, the caching control component 112 can determine to store a portion of an item. For example, the caching control component 112 can determine an amount of data to store for a particular item based on a determined popularity, cache availability (e.g., available memory space), and/or statistical data associated with a cache. For example, caching control component 112 can determine relative popularities among items and store a larger portion of an item based on a higher relative popularity. It is noted that caching control component 112 can employ a learning algorithm to alter system 100's performance.

It is further noted that caching control component 112 can utilize various control schemes. In an aspect, caching control component 112 can cache items based on item size, transmission times (e.g., average transmission time for an item), creation data, accessibility, and the like. For example, caching control component 112 can determine transmission times (e.g., average round trip transmission, etc.) for items and can store items having relatively higher transmission times. In another example, caching control component 112 can store items having relatively higher transmissions only if the items meet a popularity threshold.

It is noted that caching can comprise storing a copy of an item from one memory (e.g., a memory of source 106) in a different memory such as memory component 116. In various aspects, a cached copy can comprise part of an item or an entire item. In an aspect, caching can decrease access time, increase a capacity of a network, and enhance other aspects of efficiency and/or performance.

In conventional cooperative MIMO, all the payload data at the base stations is obtained from a central processor (e.g., source 106) via backhaul links. However, media streaming applications are more concerned about delivering content (media files) rather than delivering random raw information bits. In embodiments, caching control component 112 can control caches of base station 110 and base station 108 to cache some content (e.g., media packets or coded media packets) that may be delivered to the users. The physical layer transmissions depends on the dynamic base station cache hit status with respect to the contents requested by user devices 122 and 124.

Figure 2:
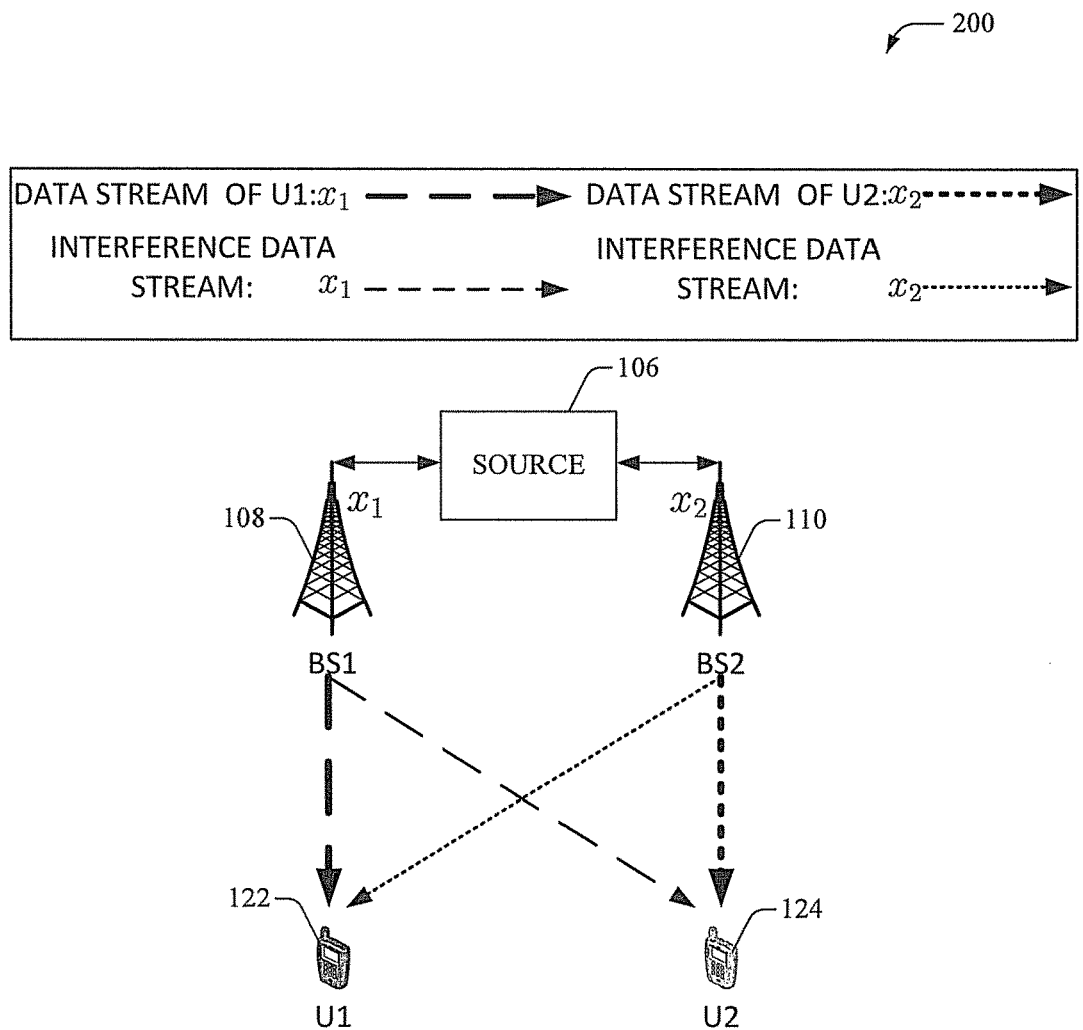
FIG. 2 is an example non-limiting schematic diagram of a system that can facilitate transmissions in a networked environment, according to an aspect or embodiment of the subject disclosure.

FIG. 2, with reference to FIG. 1, depicts an example non-limiting schematic diagram of a system 200 that can facilitate transmissions in a networked environment, according to an aspect or embodiment of the subject disclosure. As depicted, system 200 can comprise some or all components of system 100. In embodiments, system 200 can describe a first transmission mode associated with system 100.

In an example, when the cache contents at base station 108 and base station 110 does not match a requested content from the user equipment 122 and user equipment 124, base stations 108 and 110 may employ interference transmission mode where the base stations need to handle interference among the transmitted data streams and they need to be separated either in time (TDMA), Frequency (FDMA), or codes (CDMA).

Figure 3:
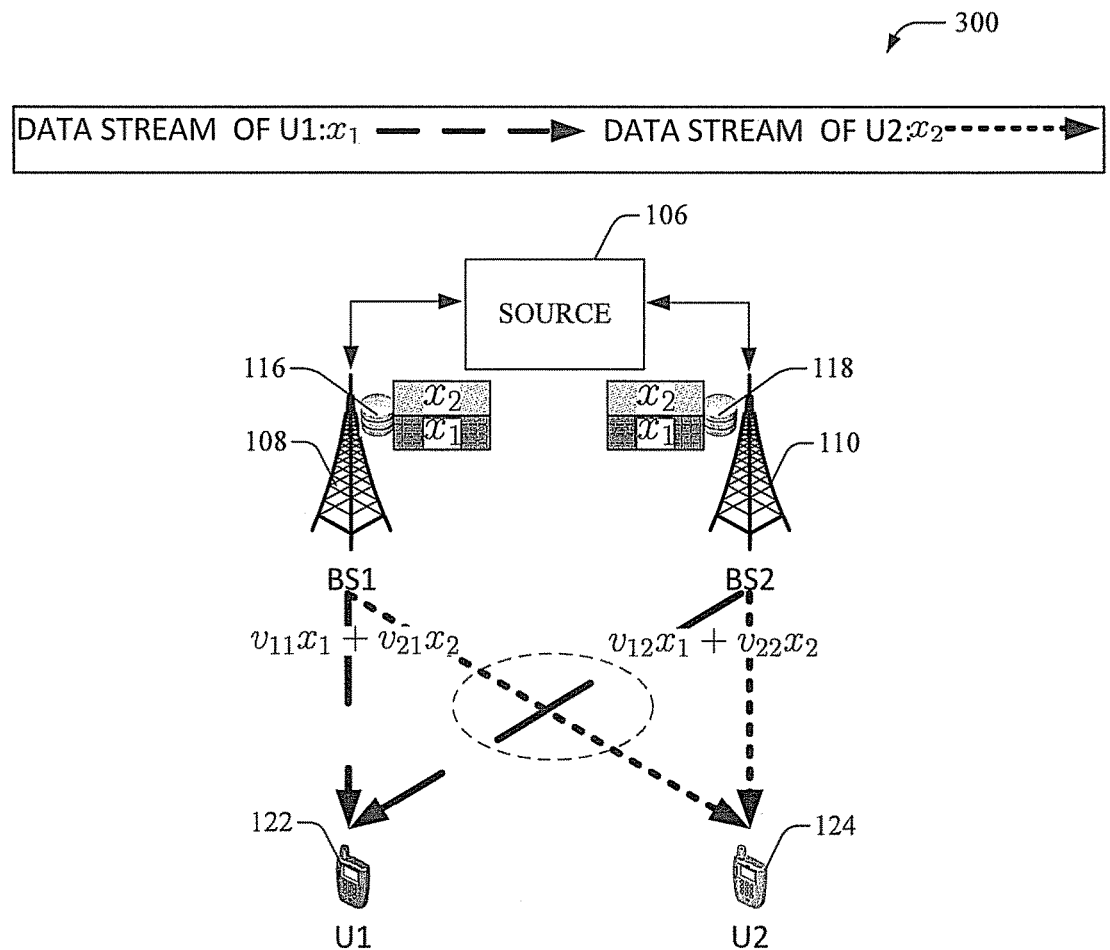
FIG. 3 is an example non-limiting schematic diagram of a system that can facilitate cooperative physical layer caching and transmissions in a networked environment, according to an aspect or embodiment of the subject disclosure.

FIG. 3, with reference to FIGS. 1 and 2, depicts an example non-limiting schematic diagram of a system that can facilitate cooperative physical layer caching and transmissions in a networked environment, according to an aspect or embodiment of the subject disclosure. It is noted that, system 300 can comprise some or all components of system 100. In embodiments, system 300 can describe a second transmission mode associated with system 100.

As depicted in FIG. 3, when the cache contents at base station 108 and base station 110 matches the requested content from the user equipment 122 and user equipment 124, base stations 108 and 110 can employ a cooperative transmission mode where concurrent transmissions of multiple data streams from the two cooperating base stations 108 and 110 do not have interference and therefore, can enjoy a better capacity without consuming backhaul. In the cooperative transmission mode, at least two base stations (e.g., base stations 108 and 110) cooperatively transmit spatially multiplexed different data streams to different users (sharing the same bandwidth and time) using the shared payload data at the base station cache (e.g., cache 116 and/or 118).

Figure 4:
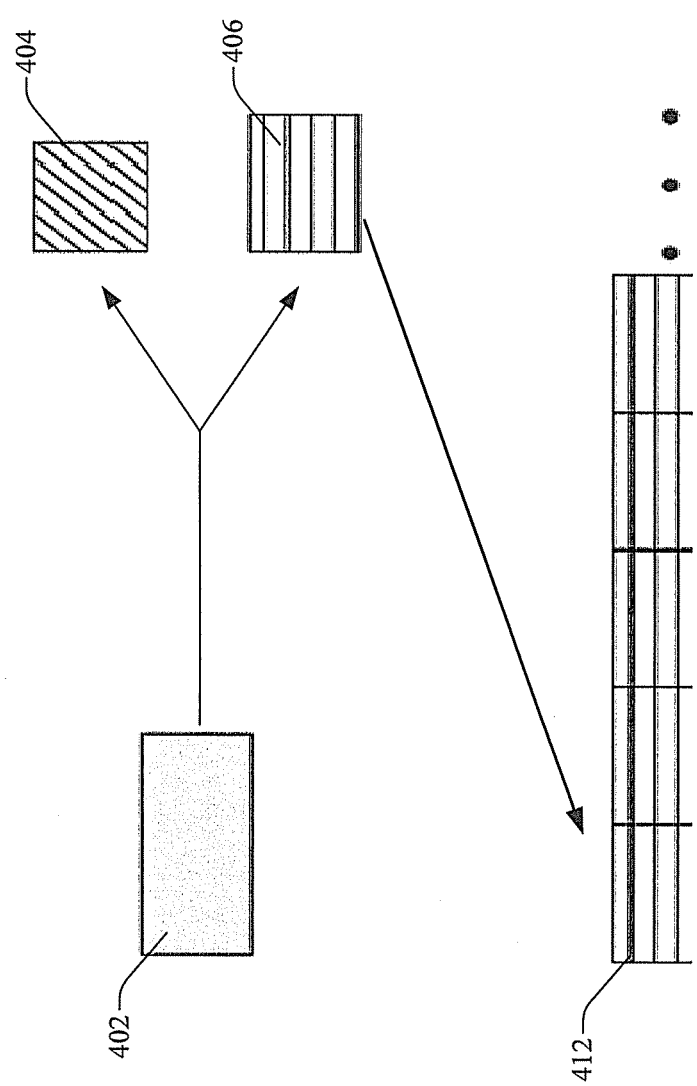
FIG. 4 is an example non-limiting schematic diagram of a system that can facilitate cooperative physical layer caching and transmissions in a networked including controlling contents of a cache, according to an aspect or embodiment of the subject disclosure.

Turning to FIG. 4, with reference to FIGS. 1-3, depicted is a block diagram of system 400 illustrating a cache data structure at each base station (e.g., base station 108, base station 110, etc.). Caching control component 112 can facilitate storage of content files according to the cache data structure. In embodiments, caching control component 112 can utilize various coding processes to store data, such as rateless coding processes. For instance, caching control component 112 can utilize a Maximum Distance Separable (MDS) coding process and/or other coding processes such as Partial Maximum Distance Separable (PMDS) coding processes. MDS coding processes are a form of an erasure code. Erasure codes transforms a message of p symbols into a longer message (code word) with q symbols such that the original message can be recovered from a subset of the q symbols, where p and q are numbers. The fraction $r=p/q$ is called the code rate, the fraction $p'/p$, where $p'$ denotes the number of symbols required for recovery, is called reception efficiency. More particularly, MDS is an optimal erasure code that has the property that any p out of the q code word symbols are sufficient to recover the original message.

In embodiments, a MDS caching scheme can divide content segment 402 into segments. Suppose there are L content files available on the content servers, and user equipment 122 can request access to one of the L content files. Each segment consists of $L_S$ bits, and it is encoded into $L_S$ parity bits using a MDS rateless code, where $L_S$ is a number. An MDS rateless code can generate an arbitrarily long sequence of parity bits from an information packet of $L_S$ bits such that if the decoder obtains any $L_S$ parity bits, it can recover the original $L_S$ information bits. For example, caching control component 112 can utilize Raptor codes or other coding scheme. It is noted that Raptor codes can cost of a small redundancy overhead. The cache at each base station (e.g., base station 110, base station 108, etc.) stores the same $q_l L_S$ parity bits for every segment of the l-th content file, where $q_l$ is called the cache control variable for convenience. It is further noted that packets of parity bits within the requested segment of content can be delivered to user devices in an arbitrary order without explicit signaling for in-order reassembly locally at the devices.

The MDS-coded cache data structure is very flexible in the sense that caching control component 112 can control when to use the cached data at a base station to help the communications to user equipment 122. Specifically, let $S_{k,n}$ denote the cache state associated with user k and macro/pico base station n, where $S_{k,n}=1$ means that the payload data of user k is in the cache of base station n and base station n is chosen to contribute to the communication of user k. Suppose that user k is requesting the l-th content file. If user k hasn't received all of the $q_l L_S$ cached parity bits 406 of the currently requested segment, then caching control component 112 can either let $S_{k,n}=1$ (i.e., base station n is chosen to contribute to the communication of user k) or let $S_{k,n}=0$ (i.e., base station n is not chosen to contribute to the communication of user k). On the other hand, if user k has already received all of the $q_l L_S$ cached parity bits 406 of the currently requested segment, then caching control component 112 can let $S_{k,n}=0$ because none of the base stations has the parity bits (payload data) requested by user k. After determining the cache state $S_{k,n}$, ∀k, n, all or some of the base stations in $\mathcal{B}_k \triangleq \{n:S_{k,n}=1\}$ employing cooperative MIMO transmission to serve user k. For convenience, $\mathcal{B}_k$ is called the cache-induced active base station set for user k. Un-cached bits 404 can comprise $(1-q_l)L_S$ bits.

In another aspect, to increase the cache-induced MIMO cooperation opportunity, caching control component 112 can instruct all base stations to cache the same media packets (or coded media packets) for each media file. In practice, there are usually a few popular media files that are accessed much more frequently than the other video files. Intuitively, the more popular the media file is, the larger portion of its media packets (or coded media packets) caching control component 112 can determine to store in a base station cache (e.g., memory component 116) to increase the cache-induced MIMO cooperation opportunity. Hence, the value of the cache control variables $q_l$'s can be determined by caching control component 112 based on the popularity of video files and the cache size at base station (e.g., memory component 116 of base station 110) to minimize the average backhaul consumption. The cached parity bits 406 can correspond to a set of cached parity bits 412 for segment 402.

Base station 110 can employ caching control component 112 to update a cache (e.g., stored in memory component 116). Updating a cache can comprise adding a new item (e.g., packet and/or group of packets), deleting an item, replacing an item, and/or altering an item or representation thereof, for example. In another aspect, caching control component 112 can update data identifying a cache state. A cache state can include data identifying operations being performed on a cache (e.g., altering items stored in the cache), and/or a list of items stored in the cache.

It is noted that system 100 can utilize a centralized caching control employed at base station 108 or other network device. In a centralized caching control scheme, base station 108 can monitor states of a cache and/or instruct caching control component 112 to perform updates. In a distributed caching control scheme, a base station 110 can manage caching control.

In an implementation, base station 110 can schedule user equipment devices (e.g., such as user equipment device 122) for transmissions, such as to receive packets. Base station 110 can determine whether base station 110 and/or base station 108 contain data associated with a request by user equipment device 122.

For example, base station 108 can determine a transmission scheme based on determining whether base station 110 contains packets for transmission. If base station 110 and base station 108 contain the packets, base station 108 and base station 110 can perform Co-MIMO and/or Multi-user MIMO (MU-MIMO) transmissions to serve user equipment device 122. For example, base station 110 can take over transmissions of packets to user equipment device 122 as long as base station 110 contains the packets. It is noted that in some cases base station 108 can control transmission even if base station 110 contains the packets based on a measured system performance (e.g., measured system performance falls below a threshold and/or a number of users meets a threshold), based on network statistics (e.g., throughputs), based on characteristics of connections (e.g., type of backhaul connection, etc.), or the like. For example, if base station 110 is servicing a large amount of users, base station 110 may experience bottlenecks or other delays. If base station 108 contains data associated with a request by a user equipment device 122, base station 108 and base station 110 can utilize Co-MIMO based on cache content. In another example, a first user equipment device 122 and a second user equipment device 124 can both request content files. Base station 108 and base station 110 can utilize Co-MIMO based on cache content to service the requests of the first and second user equipment device simultaneously or substantially simultaneously. Such cache induced Co-MIMO transmissions can create spatial multiplexing gain.

Figure 5:
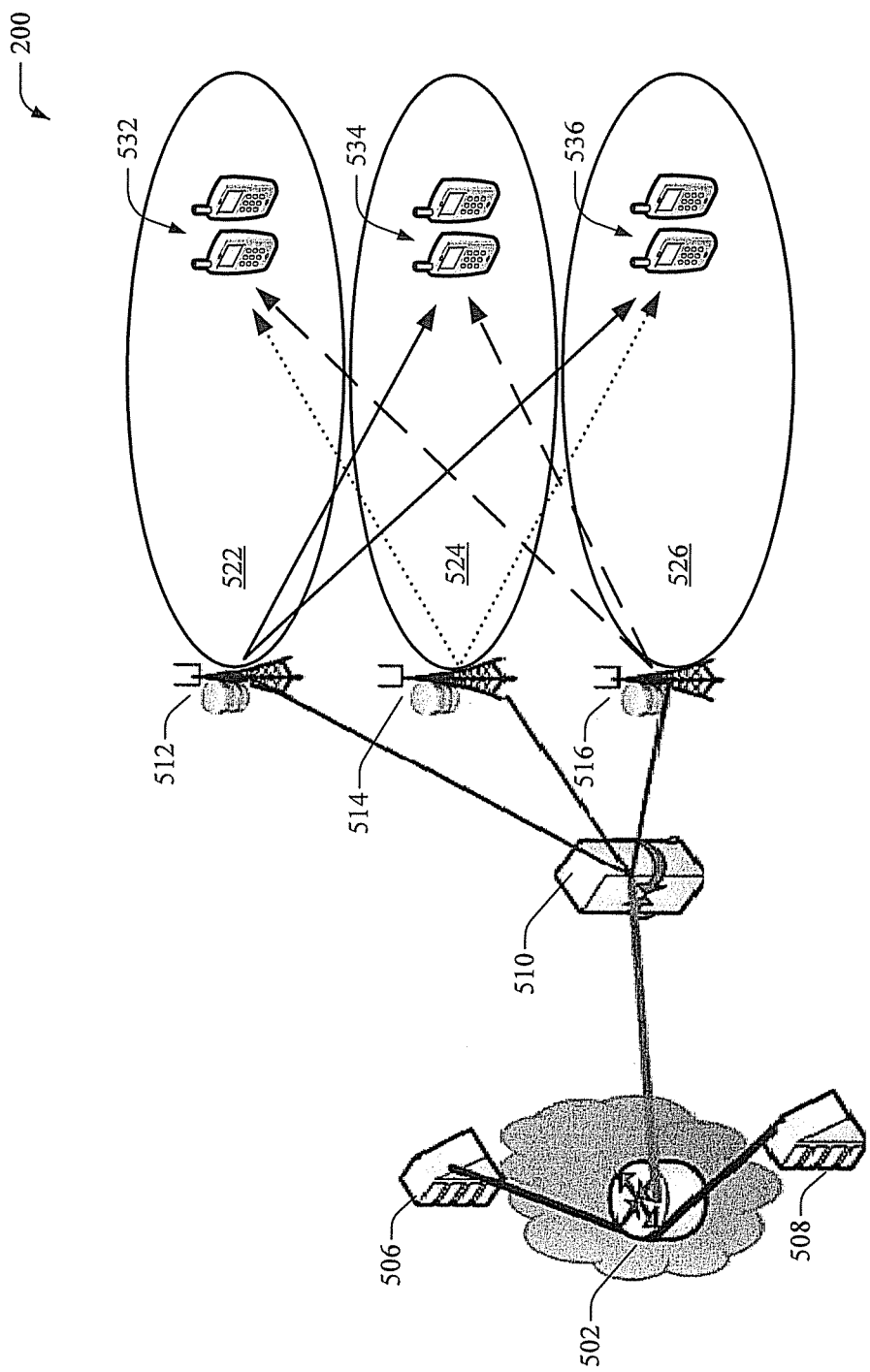
FIG. 5 is an example non-limiting schematic diagram of a system that can facilitate cooperative physical layer caching and transmissions in a networked including flexible cooperative transmissions, according to an aspect or embodiment of the subject disclosure.

FIG. 5 is an example non-limiting system 500 for cooperative network management and physical layer caching in accordance with an exemplary embodiment of this disclosure. The system 500 can include a media server 506 (which can store raw content files), a media server 508, a server 502, a central processor 510 (which can access server 502, media server 506 and media server 508), base station 512, base station 514 and base station 516. Base station 512 can have a coverage area 522, base station 514 can have a coverage area 524, and base station 516 can have a coverage area 526. As depicted, user equipment devices 532 are within coverage area 522 and can be serviced by or attached to base station 512. Likewise, user equipment devices 534 are within coverage area 524 and can be serviced by or attached to base station 514 and user equipment devices 536 are within coverage area 526 and can be serviced by or attached to base station 516. It is noted that each base station can include a cache as depicted.

Each base station (e.g., base station 512, base station 514, and base station 516) can have interfering connections to user equipment devices not attached to the respective base station. For example, base station 512 is depicted as having interfering connections (e.g., solid lines in FIG. 5) with user equipment devices 534 and user equipment devices 536. Furthermore, base station 514 is depicted as having interfering connections (e.g., dotted lines in FIG. 5) with user equipment devices 532 and user equipment devices 536. Base station 516 is depicted as having interfering connections (e.g., dashed lines in FIG. 5) with user equipment devices 532 and user equipment devices 534. As used herein, interfering connections refer to potential connections to user equipment devices that are not attached to a base station. However, the user equipment devices are still within range of a number of radio access networks (e.g., various cellular networks, Wi-Fi networks, and the like) of the base station through the interfering connection.

While the various components are illustrated and described as separate components, it is noted that the various components can be comprised in one or more other components. Further, it is noted that the system 500 can comprise additional components not shown for readability. It is noted that system 500 can comprise any number of base stations, servers, media servers, and user equipment devices. In an aspect, base station 512, base station 514, and base station 516 can perform similar to base station 110 and base station 108 as described above. User equipment devices 532, 534, and 536 can comprise a number of user equipment devices in range of network components and can each function similar to user equipment device 122. It is further noted that central processor 510, server 502, media server 506, and/or media server 508 can function similar to source 106.

As depicted, base station 512 can be in communication with central processor 510 through a high speed backhaul connection to central processor 510. It is noted that a high speed backhaul connection can comprise wired connections (backhaul broadband wired network, an optical fiber connection, twisted-pair line, T1/E1 phone line, digital subscriber line, coaxial cable, and/or the like), and or radio broadcasts (e.g., cellular channels, Wi-Fi channels, satellite channels, and/or the like). It is further noted that other base stations can be similarly connected to central processor 510.

In an implementation, system 500 can utilize a cooperative physical layer caching control scheme or Co-MIMO cache induced control scheme as described herein. In a Co-MIMO cache induced control scheme, base station 512 or another network device can control caching of content files to create Co-MIMO opportunities. In another embodiment, central processor 510 can control caching of content files by the base stations. In an aspect, base station 512 or another network device can determine cache control schemes and implement Co-MIMO cache induced control scheme based on data representing statistical information, as described with reference to FIGS. 1-4.

In one or more implementations, system 500 can utilize a cache-state dependent physical topology. For example, when requested payload data of a set of user equipment devices (e.g., user equipment devices 532, 534, and/or 536) exists simultaneously in several nearby base stations (e.g., base stations 512, 514 and 516) these base stations can employ Co-MIMO transmissions to jointly serve these set of user equipment devices. As a result, the cache-induced Co-MIMO transmissions can change the physical topology and/or transmission modes. For instance, base station devices participating in the Co-MIMO transmissions can alter from an interference transmission mode (e.g., interference channel topology) to a cooperative transmission mode (e.g., broadcast channel topology). In an aspect, altering a transmission mode to a cooperative mode can induce spatial multiplexing gain without consuming backhaul. It is noted that an interference transmission mode can comprise a base station serving attached user equipment devices (e.g., base station device 512 services user equipment devices 532), while user equipment devices not attached to the base station (e.g., user equipment devices 534 and 536) may experience interference due to transmissions of base station device 512. Hence, in the interference transmission mode, base station devices 512, 514, and 516 need to handle interference among the transmitted data streams and they need to be separated either in time (TDMA), frequency (FDMA) or codes (CDMA). It is further noted that a cooperative transmission mode can comprise two or more base station devices that broadcast or generate concurrent transmissions of multiple data streams to user equipment devices that are not attached to the two or more base station devices base station device without interference. For instance, base station device 512, 514 and 516 can generate concurrent transmissions of multiple data streams (six data streams in this example) to user equipment devices 532, 534 and 536.

In an example, there are N base stations serving K user equipment devices. As depicted N=3 and K=6. Each base station (e.g., base station 512, base station 514, and base station 516) is equipped with its own cache. Central processor 510 can comprise user data for each user equipment device of user equipment devices 532, 534, and 536. User equipment devices 532, 534, and 536 can execute various applications requesting data from base stations 512, 514, and/or 516. In an aspect, a large portion of the traffic can come from multimedia streaming applications. As above, suppose there are L media files available on the media servers and a user equipment device can choose to stream one of the L media files. The size of the l-th media file is given as $F_l$ bits and the streaming rate is given as $\mu_l$ (bits/s).

A base station (e.g., via caching control component 112) can utilize flexible Co-MIMO cooperation among the N base stations to mitigate interference. Specifically, the payload data of each user equipment device k could be available at any subset $\mathcal{B}_k \subseteq \{1, \ldots, N\}$ of the N base stations. In at least one embodiment, system 500 can utilize an flexible cooperation between base stations. For example, base station 512 can share a first data stream with base station 514 (e.g., either via backhaul or via the cache at the base station 514) so as to cooperatively exploit interference links to user equipment devices 532. However, base station 514 does not share the data stream in return because the interference link from base station 512 and user equipment device 534 is below a threshold signal strength.

Therefore, if base station n has the payload data of user k (i.e., $n \in \mathcal{B}_k$), it can help to increase the data rate of user k by transmitting the payload data symbols of user k over the wireless link from base station n to the user k, but this also incurs the backhaul cost of transmitting the payload data from central processor 510 over the backhaul (if the payload data of user k is not in the cache of base station n). Conventional full Co-MIMO and clustered Co-MIMO schemes are special cases of the above flexible Co-MIMO scheme. In general, full MIMO cooperation is not always necessary. Using the proposed flexible MIMO cooperation, flexible cooperation patterns can be engaged to satisfy the data rate requirements of users with minimum backhaul cost.

In embodiments, cache-induced flexible MIMO cooperation can be facilitated via backhaul enabled MIMO cooperation (i.e., the payload data required for MIMO cooperation at the concerned base stations is obtained from backhaul links) and the cache-induced MIMO cooperation (i.e., the payload data required for MIMO cooperation at the concerned base stations is obtained via physical layer caching). Correspondingly, the set of base stations that contribute to the communication of user k is divided into two subsets as $\mathcal{B}_k = \mathcal{B}_k^b \cup \mathcal{B}_l^c$, where the base stations in $\mathcal{B}_k^b$ obtain the payload data of user k from backhaul links, and the current payload data of user k is in the cache of the base stations in $\mathcal{B}_k^c$.

In an aspect, a base station or other device can choose the cache control variables $g_l$'s for contend files based on popularity of media files and the base station cache size to alter (e.g., reduce, minimize, etc.) the average backhaul consumption. At each time slot, the base station or other device can determine $\mathcal{B}_k^c$, according to the cache state. Then for a given $\mathcal{B}_k^c$, the base station or other device can choose $\mathcal{B}_k^b$ to achieve a tradeoff (e.g., optimal, near optimal, improved, etc.) between performance (data rates of users) and backhaul consumption. In another aspect, the base station or other device can employ flexible MIMO cooperation with parameter $\mathcal{B}_k$ to serve the users.

Figure 6:
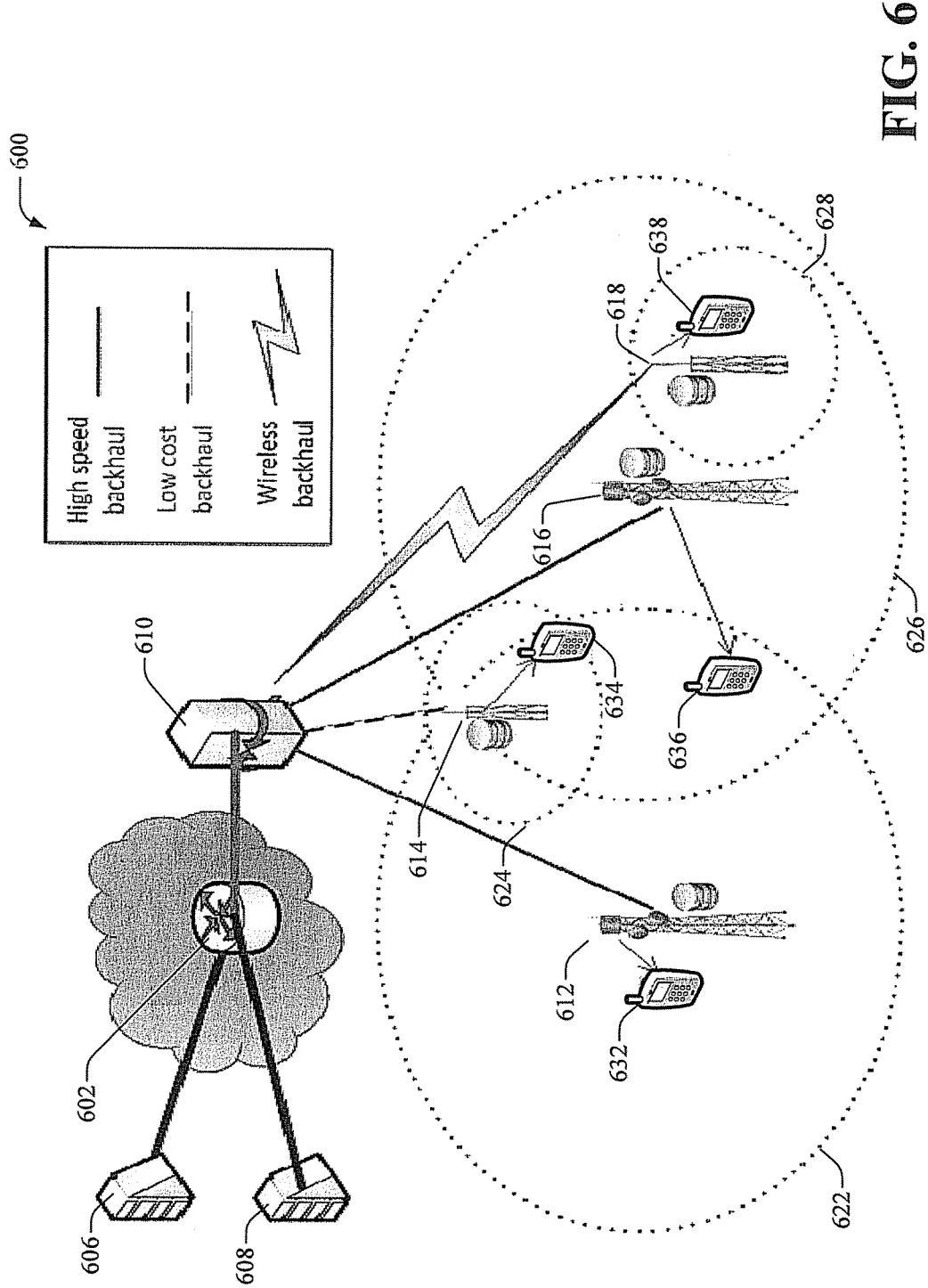
FIG. 6 is an example non-limiting schematic diagram of a system that can facilitate cooperative physical layer caching and transmissions in a heterogeneous networked including flexible cooperative transmissions, according to an aspect or embodiment of the subject disclosure.

FIG. 6 is an example non-limiting system 600 for cooperative network management and physical layer caching associated with a HetNet in accordance with an exemplary embodiment of this disclosure. The system 600 can include a HetNet for wireless communications (e.g., radio access network for Wi-Fi, cellular networks, and the like). System 600 can include a media server 606 (which can store raw content files), a media server 608, a server 602, a central processor 610 (which can access server 602, media server media server 606 and media server 608), macro base station 612, pico base station 614, macro base station 616 and pico base station 618. Macro base station 612 can have a coverage area 622, pico base station 614 can have a coverage area 624, macro base station 616 can have a coverage area 626, and pico base station 618 can have a coverage area 628. It is noted that each base station can include a cache as depicted. While the various components are illustrated and described as separate components, it is noted that the various components can be comprised in one or more other components. Further, it is noted that the system 600 can comprise additional components not shown for readability. It is noted that system 600 can comprise any number of base stations, servers, media servers, and user equipment devices. It is noted that like named components can perform similar functions unless context suggests otherwise. For instance, macro base station 612, pico base station 614, macro base station 616, and pico base station 618 can perform similar to base station 110, base station 108, and the like, as described above.

As depicted, user equipment device 632 are within coverage area 622 and can be serviced by or attached to macro base station 612. Likewise, user equipment device 634 is within coverage area 624 and can be serviced by or attached to pico base station 614, user equipment device 636 is within coverage area 626 and can be serviced by or attached to base station 516, and user equipment device 638 is within coverage area 628 and can be serviced by or attached to pico base station 618.

In embodiments, one or more of the network devices can implement a base station caching scheme that can significantly reduce the backhaul cost in a HetNet. For sake of brevity, central processor 610 is described as comprising a caching control component (e.g., caching control component 112). However, it is noted that one or more other network device (e.g., macro base station 612, server 602, etc.) can comprise a caching control component. In various embodiments, macro base stations 612/616 and pico base stations 614/618 can comprise a large (but limited) cache. Macro base stations 612/616 can comprise or be associated with high speed backhaul connections (e.g., with central processor 610). However, pico base stations 614/618 can comprise or be associated with wireless backhaul connections and/or low-cost wired backhaul connection.

As described herein, a user equipment device (e.g., user equipment device 632) can utilize various applications that request data from a base station (e.g., macro base station 612). In many cases, a large portion of the traffic can come from content delivery applications such as multimedia streaming applications, video on demand applications, and the like.

Central processor 610 can control a cache of each base station to facilitate storage of content in respective cache memory devices. The cached content can be exploited to alter (e.g., improve) performance and/or alter (e.g., reduce) backhaul consumption using different cache-induced transmission modes under different situations. For example, if the payload data for user equipment device 634 is available at the cache of the associated pico base station 614 and the neighbor macro base station 616, then the pico base station 614 and the neighbor macro base station 616 can engage in cache-induced Co-MIMO transmission without consuming backhaul bandwidth. On the other hand, if the payload data of pico cell user 638 is only available at the cache of the associated pico base station 618, then it can be served by the pico base station 618 using "normal" transmission in HetNet without consuming backhaul bandwidth. Hence, there is a base station caching gain due to the cache-induced transmissions and the gain can be proportional to the probability that the payload data of the scheduled users are in the base station caches. For instance, in the extremely case when all the payload data requested by the user equipment devices are in the caches of all pico base stations (e.g., pico base station 614 and pico base station 618), the capacity of a HetNet with base station caching is proportional to the number of pico base stations and such capacity can be achieved without backhaul connections to the pico base stations.

In embodiments, there are usually a few popular content files that are accessed much more frequently than the other content files. Central processor 610 can control caches to store larger portions of parity bits in caches of base stations for a content file meeting a defined level of popularity and/or relative level of popularity. Hence, the value of the cache control variables $q_l$'s can be determined by the popularity of content file and the cache size at the base stations so as to reduce or minimize the average backhaul consumption.

Depending on the cache state (or equivalently, the cache-induced active base station sets $\mathcal{B}_k$'s) and user locations, there are at least four different cache-induced transmission modes in system 600. In different cache-induced transmission modes, the roll (benefit) of base station caching is different. It is noted that other transmission modes and/or nomenclatures can be utilized by system 600. For instance, different types of base station devices than macro or pico can be utilized. For sake of brevity, the transmission modes are described with reference only to pico and macro base stations. Additionally, the modes are described with no more than two base stations participating in transmissions for a user equipment device.

In a first mode, two macro base stations (e.g., macro base station 612 and macro base station 616) participate in Co-MIMO transmissions, referred to herein as cache-induced macro-macro Co-MIMO transmission. For a macro cell edge user equipment device (e.g., user equipment device 634), if the corresponding cache-induced active base station set is its associated and neighbor macro base stations (e.g., ., macro base station 612 and macro base station 616), these macro base stations will employ cooperative MIMO transmission to serve this macro cell edge user without consuming backhaul bandwidth. In this case, the role of base station caching is to induce physical layer (co-tier) MIMO cooperation as well as reduce backhaul consumption of macro base stations. For example, user equipment device 636 is in coverage area 622 and coverage area 626 associated with macro base station 612 and macro base station 616, respectively. If macro base station 612 and macro base station 616 both comprise content in cache memory devices for a request, the content can be cooperatively transmitted to user equipment device 636. It is noted that macro base station 612 and macro base station 616 can utilize partial or full Co-MIMO transmissions.

In a second mode, a macro base station (e.g., macro base station 612) and a pico (e.g., pico base station 614) participate in Co-MIMO transmissions, referred to herein as cache-induced macro-pico Co-MIMO transmission. For a pico cell user equipment device (e.g., user equipment device 634), if the corresponding cache-induced active base station set is its associated pico base station 614 and neighbor macro base station 612, the pico base station 614 and macro base station 612 can employ partial Co-MIMO transmission to simultaneously serve pico cell user 634 and macro cell user 632 without consuming backhaul bandwidth. In this case, the role of base station caching is to induce physical layer (cross-tier) flexible MIMO cooperation as well as reduce backhaul consumption of pico base stations.

In a third mode, one pico base station (e.g., pico base station 614 or pico base station 618) participates in MIMO transmissions, referred to herein as cache-induced pico transmission. For a pico cell user equipment device (e.g., user equipment device 638), if the corresponding cache-induced active base station set is its associated pico base station (e.g., pico base station 618), then it can be served by the pico base station using "normal" transmission in HetNet without consuming backhaul bandwidth. In this case, the role of base station caching is to facilitate load balancing (i.e., move some of the traffic from macro base station to pico base station) as well as reduce backhaul consumption of pico base stations.

In a fourth mode, one macro base station (e.g., macro base station 612 or macro base station 616) participates in MIMO transmissions, referred to herein as cache-induced macro transmission. For a macro cell user equipment device (e.g., user equipment device 632), if the corresponding cache-induced active base station set is its associated macro base station 612, then it can be served by the macro base station 612 using "normal" transmission in HetNet without consuming backhaul bandwidth. In this case, the role of base station caching is to reduce backhaul consumption of macro base stations.

It is noted that a MDS-coded cache data structure, as described herein, creates more freedom for resource allocation and interference coordination in HetNet. For example, with the above MDS-coded cache data structure, system 600 can align the cache-induced macro-pico Co-MIMO transmission of several pico cell users to increase the cross-tier MIMO cooperation gain. System 600 can also align the cache-induced pico transmission for pico cell users to facilitate interference coordination (e.g., almost blank subframe control) in HetNet.

In an embodiment, base station caching schemes for HetNet can utilize cached content at the macro/pico base stations to induce the different transmission modes depending on the cache state and user location. Under different cache-induced transmission modes, the role (benefit) of base station caching may be different. For example, central processor 610 can choose the cache control variables $q_i$'s based on the popularity of media files and the base station cache size to minimize the average backhaul consumption. At each time slot, central processor 610 can generate the cache state $S_{k,n}$, $\forall k, n$ for each user based on the cache data structure as described with reference to FIG. 4. In another aspect, at each time slot, central processor 610 can schedule a set of users and determine the transmission mode for each user according to the cache state and channel state information to maximize the overall performance.

Figure 7:
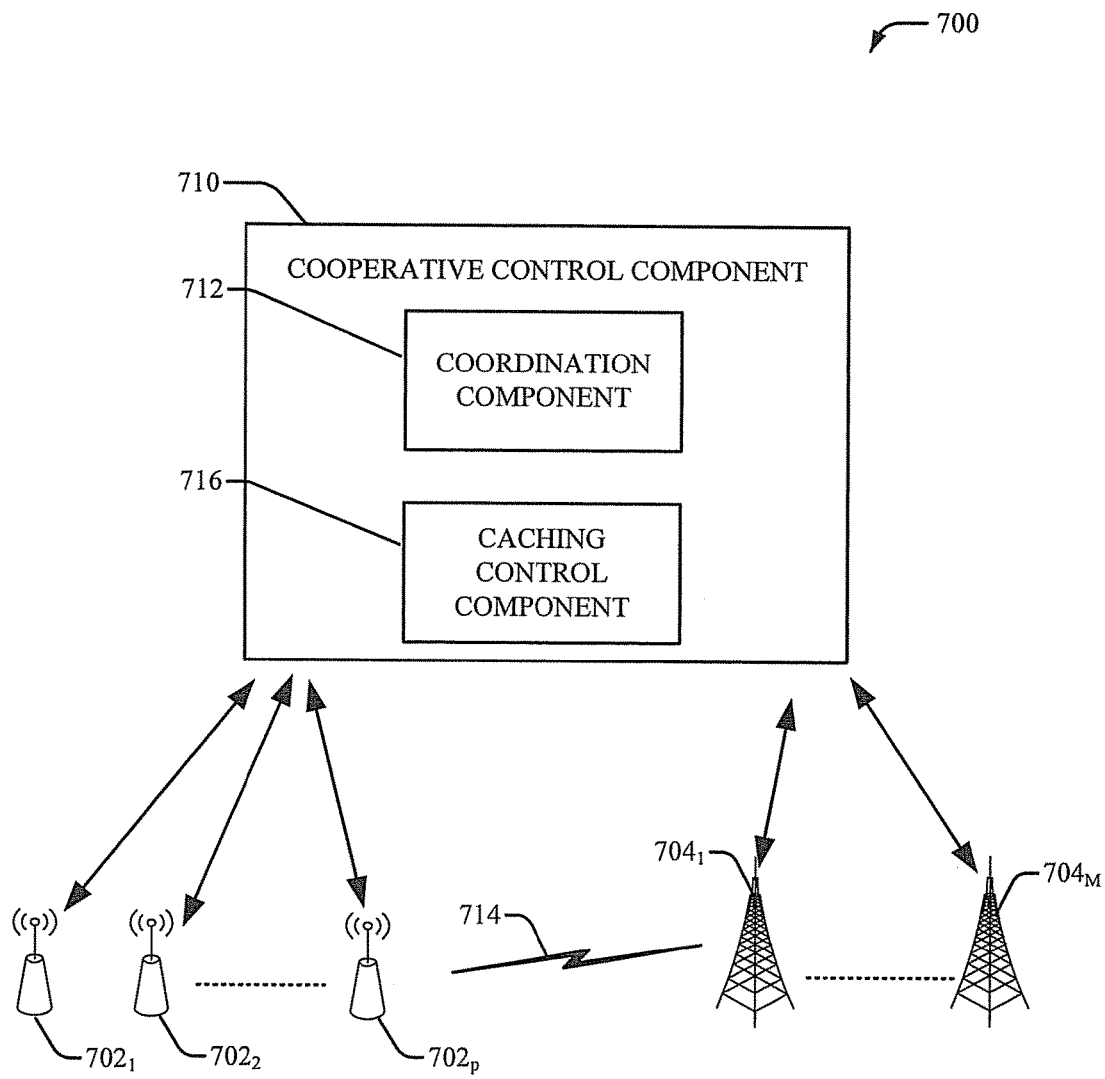
FIG. 7 is an example functional high level block diagram of a system that can facilitate cooperative physical layer caching and transmissions, including a cooperative control component, according to an aspect or embodiment of the subject disclosure.

FIG. 7 is an example non-limiting schematic diagram of a system 700 that facilitates cooperative physical layer caching and transmissions in a networked environment. System 700 can comprise various embodiments described herein. While the various components are illustrated as separate components, it is noted that the various components can be comprised in one or more other components. Further, it is noted that the system 700 can comprise additional components not shown for readability. Additionally, the various components may be contained on one device, or on a number of devices.

System 700 can comprise a cooperative control component 710 that can control transmissions in a network and/or operations associated with caching content. In an aspect, cooperative control component 710 comprises a coordination component 712 and a caching control component 716. In another aspect, system 700 can include a set of P pico base stations 702₁-702_P, where P is a number, and a set of M macro base stations (704₁-704_M). It is noted that each pico base stations 702₁-702_P can communicate with each other, one or more macro base stations (704₁-704_M), and cooperative control component 710. Likewise, macro base stations (704₁-704_M) can communicate with each other, one or more pico base stations 702₁-702_P, and/or cooperative control component 710. Connection between the various network devices can represent a wireless connection and/or a wired connection between the various components. It is noted that macro base stations (704₁-704_M) and pico base stations 702₁-702_P can comprise various aspects disclosed herein.

Cooperative control component 710 can comprise various other components not shown for readability. It is noted that cooperative control component 710 can comprise aspects of various embodiments described herein. It is further noted that cooperative control component 710 can be comprised in larger systems and/or devices, such as a server, any of macro base stations (704₁-704_M), and/or any pico base stations 702₁-702_P. Likewise, system 700 can comprise additional cooperative control components that cooperate to perform aspects of embodiments described herein.

Cooperative control component 710 can receive data describing network statistics, devices connected to a network and/or within range of a network, cache states of caches comprised in pico base stations 702₁-702_P, cache states of caches comprised in macro base stations 704₁-704_M, control signals, data relating to scheduling, popularity metrics and the like. In an aspect, coordination component 712 can manage transmission schedules based on received data. For example, coordination component 712 can schedule transmissions and associate user devices among various components to cooperatively service user devices. In another aspect, coordination component 712 can determine transmission paths associated with a network, such as determining what components transmit select data (e.g., cached data and/or data retrieve via backhaul connections) and where components transmit data to.

Caching control component 716 can manage one or more caches associated with pico base stations $702_1$-$702_P$ and macro base stations $704_1$-$704_M$, for example. Caching control component 716 can determine cache contents and/or whether or not contents of a cache should be altered, as described herein. In another aspect, caching control component 716 instruct macro base stations ($704_1$-$704_M$) and/or any of pico base stations $702_1$-$702_P$, to perform actions, such as alter cache content, transmit data, etc.

Figure 8:
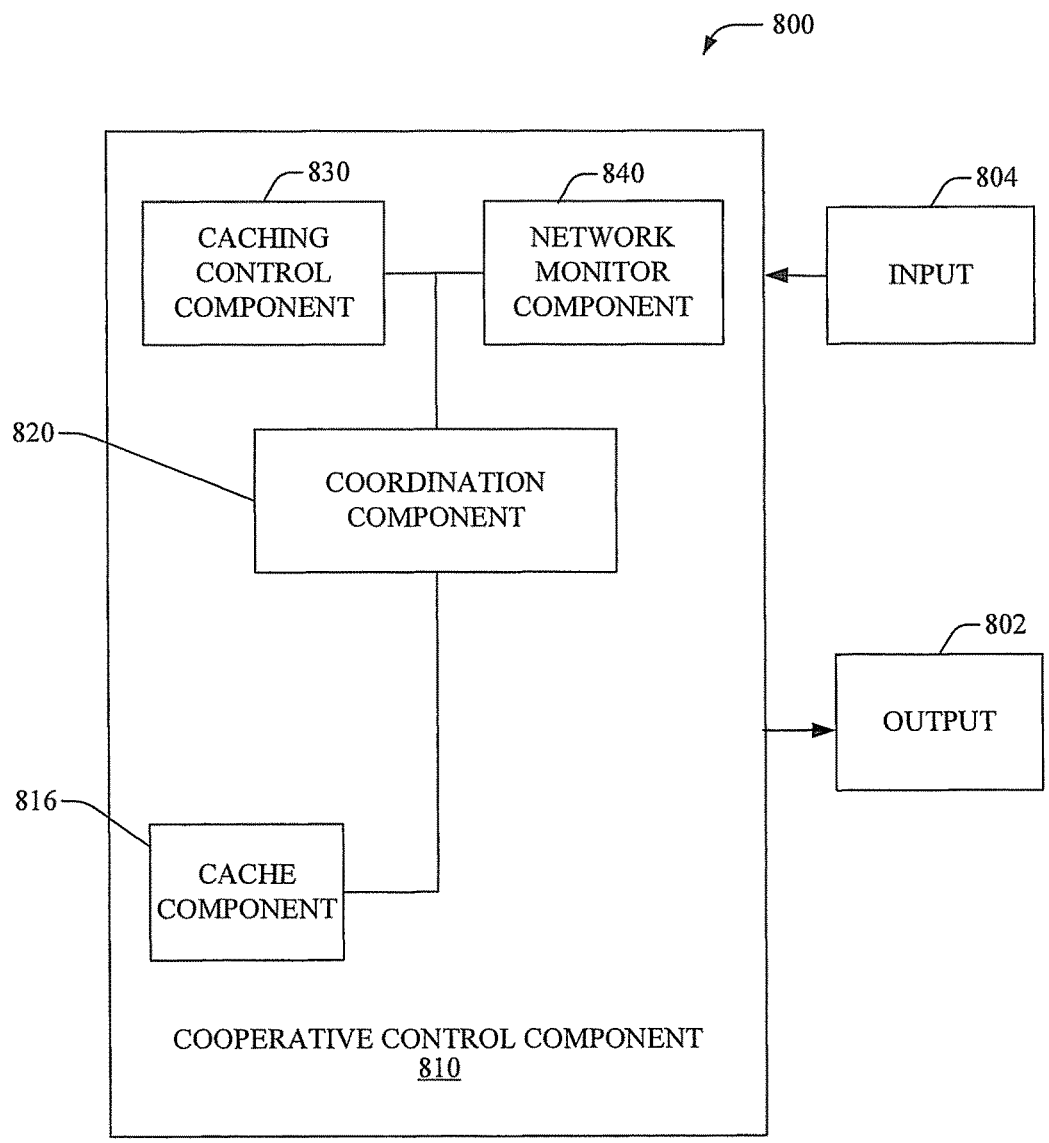
FIG. 8 is an example functional high level block diagram of a system that can facilitate cooperative physical layer caching and transmissions, including a network monitor component, according to an aspect or embodiment of the subject disclosure.

FIG. 8 is an example non-limiting schematic diagram of a system 800 that facilitates cooperative caching and transmissions in a networked environment. System 800 can comprise various embodiments described herein. While the various components are illustrated as separate components, it is noted that the various components can be comprised in one or more other components. Further, it is noted that the system 800 can comprise additional components not shown for readability. Additionally, the various components may be contained on one device, or on a number of devices.

System 800 can comprise a cooperative control component 810 that can control transmissions in a network and/or operations associated with caching content. In an aspect, cooperative control component 810 receives input 804 and generates output 802. Cooperative control component 810 can include all or part of the various embodiments disclosed herein, such as system 100, and the like. Cooperative control component 810 can further include cache component 816, coordination component 820, caching control component 830, and network monitor component 840.

Caching control component 830 can include functionality of caching control component 112 of FIG. 1, for example. In another aspect, caching control component 830 can control cache component 816. Cache component 816 can store data representing items of a source, such as MDS-coded representations of content items of a media server. In an aspect, cache component 816 can store all or a portion of an item.

In implementations, network monitor component 840 can monitor statistical information associated with a network. Statistical information can include data describing a history of access requests to media items, data describing a history of communications associated with cooperative control component 810 (e.g., delivered packets, failed packets, dropped packets, etc.), performance metrics (e.g., transmission speeds), network statistics relating to conditions of a network (e.g., number of user devices in range, e.g.,), and/or other identifiable data associated with a network. Network monitor component 840 can receive input 804 identifying statistical data and/or analyze input 804 to determine statistical data. It is noted that network monitor component 840 can receive control data, such as control variables from network components (e.g., a base station).

In an aspect, caching control component 830 can determine a cache control policy. In implementations, caching control component 830 can determine policies based on statistical information monitored by the network monitor component 840, received control data, and/or schedule accesses. For example, caching control component 830 can determine a policy based on data describing a history of statistical data. In an aspect, caching control component 830 can recognize identifiable patterns and learn network trends.

In another aspect, a policy can be based on learned network trends. It is noted that a policy can be determined, in part, based on desired application of system 800. For example, caching control component 830 can determine a cache policy based on a video on demand application and a disparate policy based on a file transfer protocol (FTP) application. In an aspect, caching control component 830 can control cache component 816 to add, remove, access, or otherwise alter contents of cache component 816. In an aspect, caching control component 830 can control cache component 816 according to one or more determined policies.

Coordination component 820 can schedule transmissions and/or determine transmission modes. A transmission can be data communicated between cooperative control component 810 and another network device, such as user equipment and/or a base station. In an aspect, coordination component 820 determines times to send output 802 to appropriate devices and/or what transmission mode to utilize based on cache content and base station types. Coordination component 820 can manage a list of scheduled transmission and associated destinations for the transmissions. It is noted that one or more transmissions can be scheduled for a same, a disparate, and/or partially overlapping time In implementations, coordination component 820 can coordinate scheduling transmissions with various network components. For example, coordination component 820 can cooperatively, with a base station for example, transmit data to user devices. In an aspect, coordination component 820 can transmit a portion of an item and a macro base station or disparate pico base station can send disparate portions of the item.

FIGS. 9-12 illustrate methods 900, 1000, 1100, and 1200 that can facilitate cooperative physical layer caching and transmissions in a networked environment. For simplicity of explanation, the methods (or procedures) are depicted and described as a series of acts. It is noted that the various embodiments are not limited by the acts illustrated and/or by the order of acts. For example, acts can occur in various orders and/or concurrently, and with other acts not presented or described herein. In another aspect, the various acts can be performed by systems and/or components of embodiments described herein.

Figure 9:
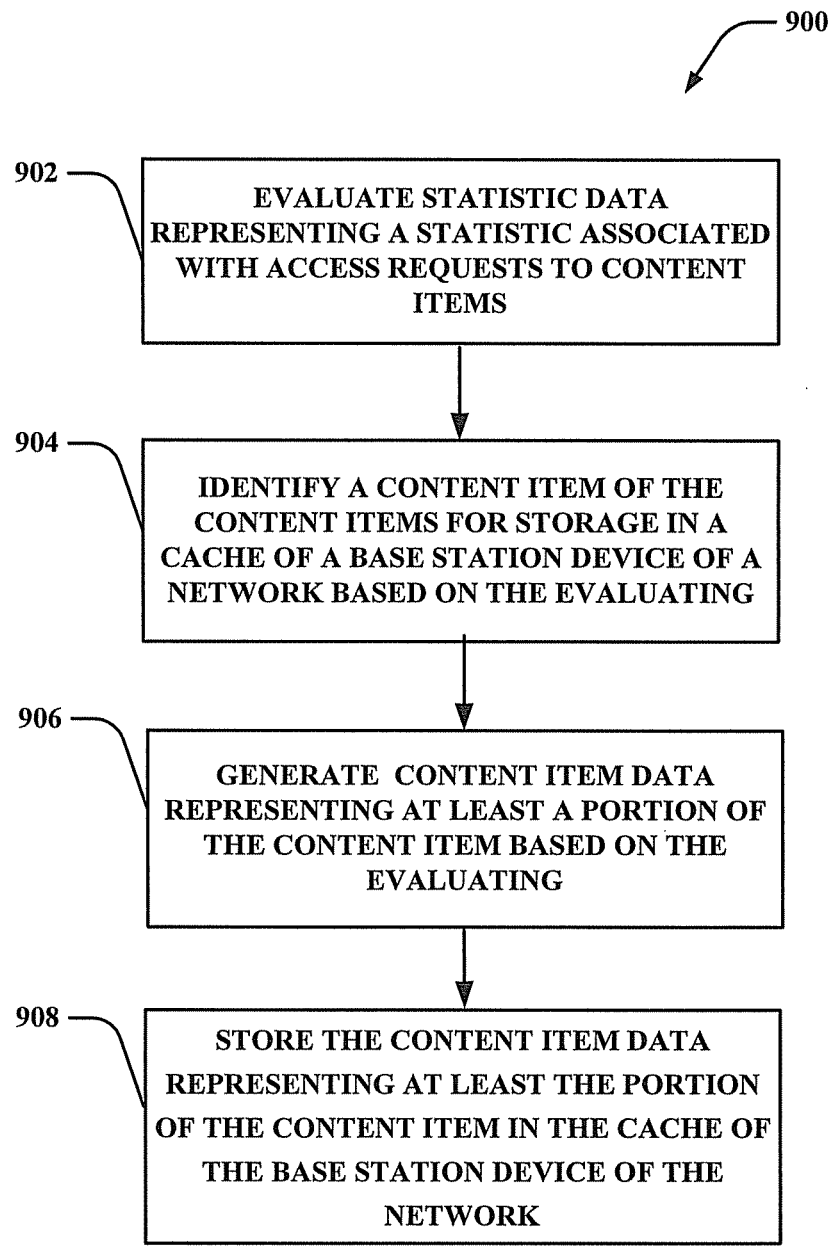
FIG. 9 is an example non-limiting process flow diagram of a method that can facilitate cooperative physical layer caching and transmissions in a networked environment including selecting content for a cache, according to an aspect or embodiment of the subject disclosure.

FIG. 9 illustrated is an example non-limiting process flow diagram of a method 900 that can facilitate cooperative physical layer caching and transmissions in a networked environment including altering a contents of a cache. The cooperative physical layer caching and transmissions can be performed by various implementations described herein.

At 902, a system can evaluate (e.g., via caching control component 112) statistic data representing a statistic associated with access requests to content items. As described herein, statistical data can be a number of access requests during a given time period, comparison of requests for other items, or a popularity metric. In an aspect, evaluation of the data can include determining a level of popularity of content items. It is noted that a content item can comprise a packet of data, a portion of a packet of data, and/or a set of packets of data.

At 904, a system can identify (e.g., via caching control component 112) a content item of the content items for storage in a cache of a base station device of a network based on the evaluating. In an aspect, the system can select a number of content items for storage based on popularity of the content items. For example, the system can select the fifty most popular items relative to other items, any content item at or over a threshold level of popularity, and the like.

At 906, a system can generate (e.g., via caching control component 112) content item data representing at least a portion of the content item based on the evaluating. For instance, the system can generate a set of parity bits for each segment of a content item. In an aspect, the parity bits can be generated based on MDS cache coding.

At 908, a system can store (e.g., via memory component 116) the content item data representing at least the portion of the content item in the cache (e.g., a memory component of the base station device of the network). As described with reference to FIG. 4, a portion of parity bits may be cached while another portion is not cached. In other embodiments, the cache can store raw or compressed content files.

Figure 10:
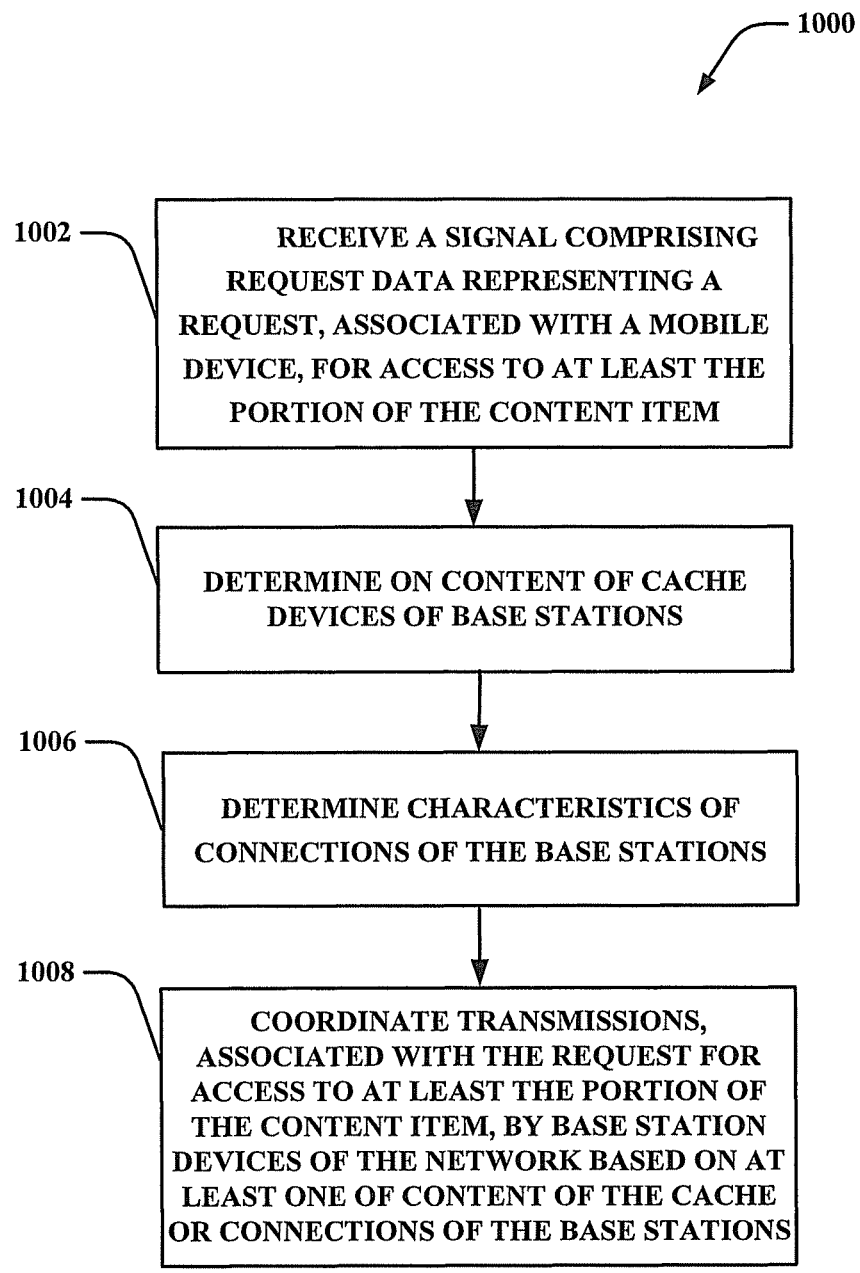
FIG. 10 is an example non-limiting process flow diagram of a method that can facilitate cooperative physical layer caching and transmissions in a networked environment including coordinating transmissions, according to an aspect or embodiment of the subject disclosure.

FIG. 10 illustrates an example non-limiting process flow diagram of a method 1000 that can facilitate cooperative physical layer caching and coordinating of transmissions in a networked environment. The cooperative physical layer caching and transmissions can be performed by various implementations described herein.

At 1002, a system can receive (e.g., via cooperative control component 710) a signal comprising request data representing a request, associated with a mobile device, for access to at least the portion of the content item. It is noted that an item can comprise a packet of data, a portion of a packet of data, and/or a set of packets of data.

At 1004, a system can determine (e.g., via caching control component 716) on content of cache devices of base stations. In an aspect, a system can determine whether the cache of the at least base station comprises a content item based on a list of the contents of the cache. In another aspect, a system can search a cache for the item.

At 1006, a system can determine (e.g., via coordination component 712) characteristics of connections of the base stations. For instance, a system can determine a type associated with a base station (e.g., macro, pico, etc.), a connection type (e.g., high cost backhaul, low cost backhaul, wired/wireless backhaul, etc.), or the like.

At 1008, a system can coordinate (e.g., via coordination component 712), transmissions, associated with the request for access to at least the portion of the content item, by base station devices of the network based on at least one of content of the cache or connections of the base stations. It is noted that coordinating transmissions can include scheduling transmissions, determining transmission paths, altering transmission modes, and the like. In an aspect, the system can, in response to determining a first cache of a first base station and a second cache of a second base station comprise the request data associated with the request to access the at least the portion of content item, instruct the first base station device and the second base station device to transmit data to the user equipment device. In another aspect, the first base station device may not communicate with another user equipment device attached to the second base station device, such as in partial Co-MIMO.

Figure 11:
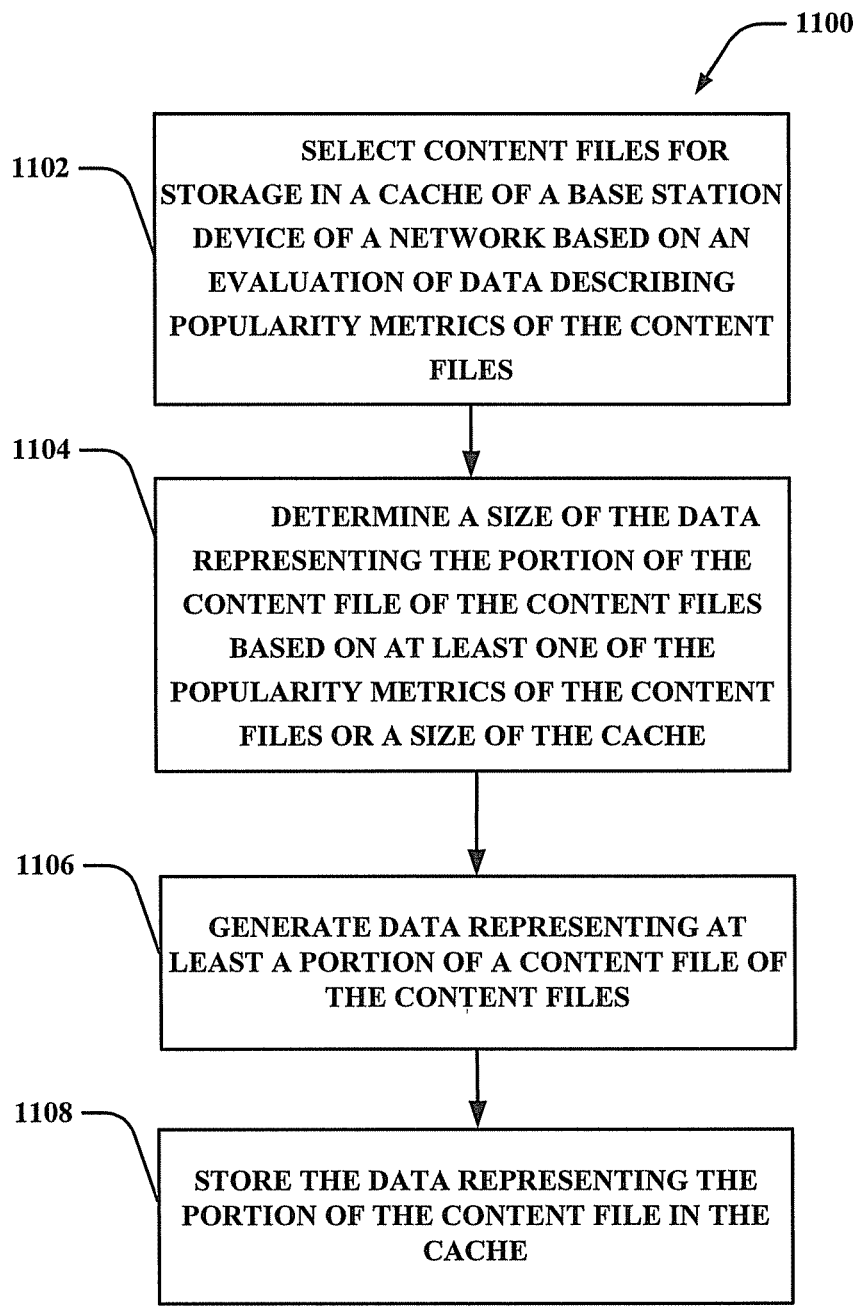
FIG. 11 is an example non-limiting process flow diagram of a method that can facilitate cooperative physical layer caching and transmissions in a networked environment including generating representation of content items for storage in a cache, according to an aspect or embodiment of the subject disclosure.

FIG. 11 illustrated is an example non-limiting process flow diagram of a method 1000 that can facilitate cooperative physical layer caching and transmissions in a networked environment including determining a cache control policy. The cooperative physical layer caching and transmissions can be performed by various implementations described herein.

At 1102, a system can select content files for storage in a cache of a base station device of a network based on an evaluation of data describing popularity metrics of the content files. For instance, content files can be selected based on respective popularities. At 1104, a system can determine a size of the data representing the portion of the content file of the content files based on at least one of the popularity metrics of the content files or a size of the cache. In an aspect, the system can allocate larger sizes of the representation of the content item for more popular content item. In some embodiments, the system may allocate a fixed percentage of cache size based on popularity. In another aspect, the system can dynamically allocate percentages of a cache size based on a function of popularity.

At 1106, a system can generate data representing at least a portion of a content file of the content files. For instance, the system can generate compressed representations of content files and the like. At 1108, a system can store the data representing the portion of the content file in the cache. In various implementations, a system can alter a cache by adding/removing items according the evaluation of data describing a statistic of the network and the cache.

Figure 12:
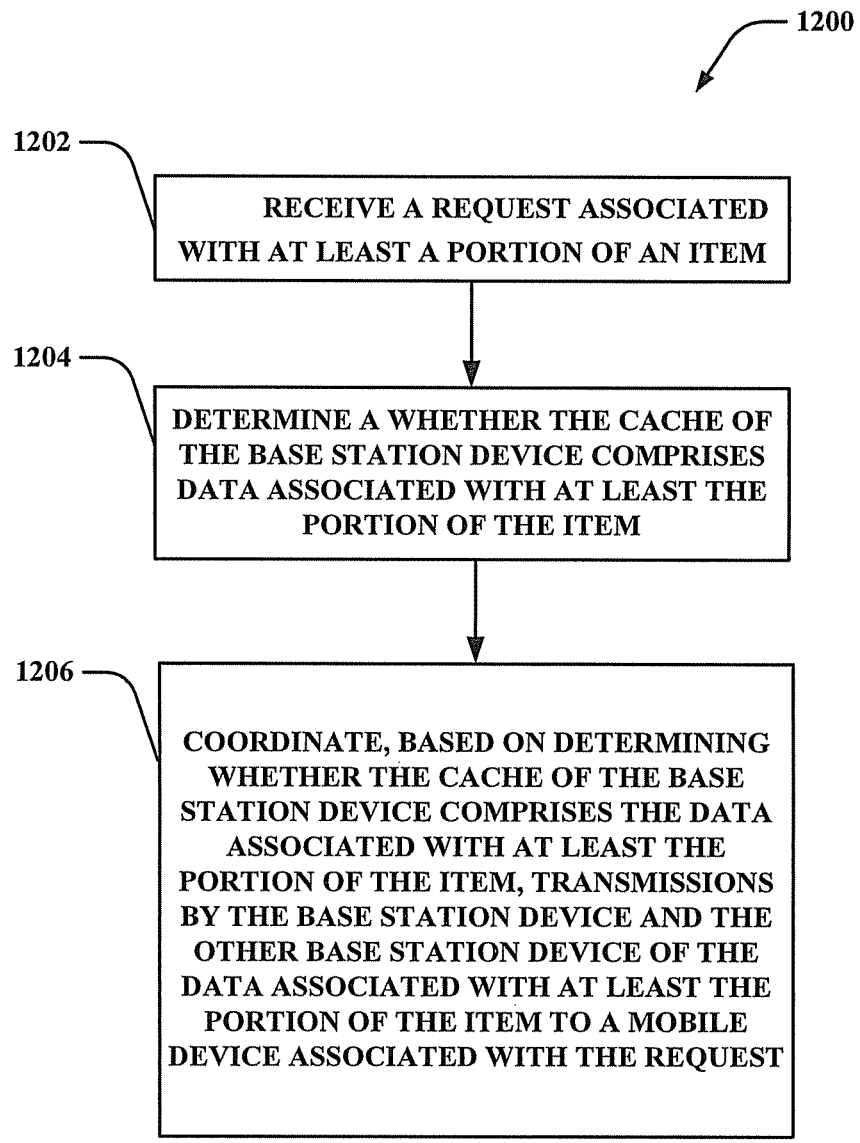
FIG. 12 is an example non-limiting process flow diagram of a method that can facilitate cooperative physical layer caching and transmissions in a networked environment based on a cache content, according to an aspect or embodiment of the subject disclosure.

FIG. 12 illustrated is an example non-limiting process flow diagram of a method 1200 that facilitates cooperative physical layer caching and transmissions in a networked environment. The cooperative physical layer caching and transmissions can be performed by various implementations described herein.

At 1202, a system can receive a request associated with at least a portion of an item. For example, a user can access a network via a user equipment device. The user equipment device can send a signal to a network device that requests access to content items. In some embodiments, the user can request a first portion of a content item, such as in systems supporting buffering of content items. In another aspect, a user can request to jump to a specific portion of a content item, such as if a user requests an option to continue viewing from a previous spot or bookmark.

At 1204, a system can determine a whether the cache of the base station device comprises data associated with at least the portion of the item. For instance, the system can look up a cache table indicating a content of base stations, can query base stations, and/or the like. At 1206, a system can coordinate, based on determining whether the cache of the base station device comprises the data associated with at least the portion of the item, transmissions by the base station device and the other base station device of the data associated with at least the portion of the item to a mobile device associated with the request. For example, a system can select a back haul connection between two network devices to retrieve a portion of a content file, can select other network devices to transmit data from cache devices, and the like. In some embodiments, the system can select a transmission mode as disclosed with reference to various described embodiments.

Figure 13:
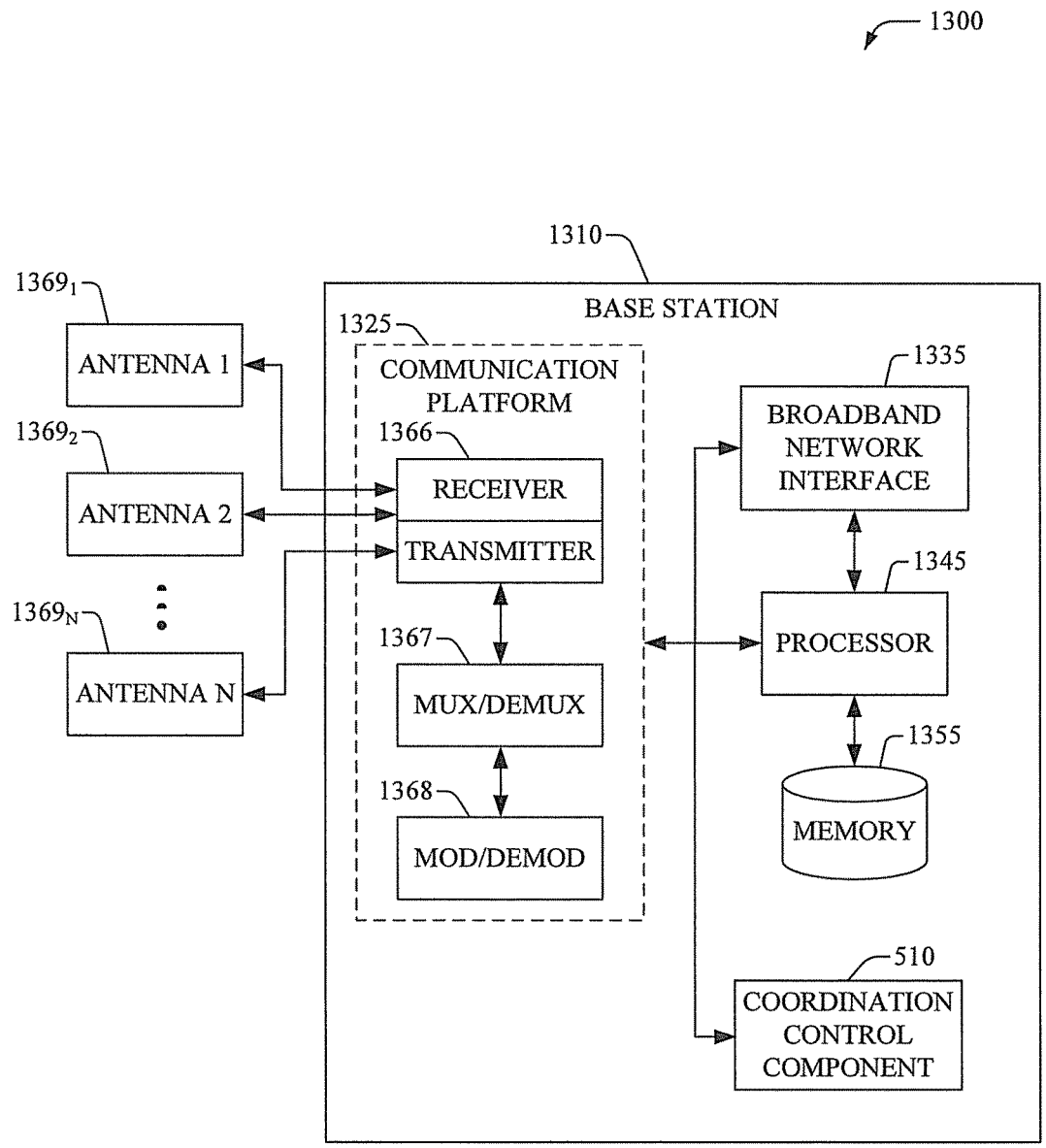
FIG. 13 illustrates an example embodiment of a base station that can cooperatively cache items to facilitate cooperative physical layer caching and transmissions, according to the subject disclosure.

With respect to FIG. 13, in example embodiment 1300, base station 1310 can receive and transmit signal(s) (e.g., traffic and control signals) from and to wireless devices, access terminals, wireless ports and routers, etc., through a set of antennas $1369_1$-$1369_N$. It should be appreciated that while antennas $1369_1$-$1369_N$ are a part of communication platform 1325, which comprises electronic components and associated circuitry that provides for processing and manipulating of received signal(s) (e.g., a packet flow) and signal(s) (e.g., a broadcast control channel) to be transmitted. In an aspect, communication platform 1325 can include a transmitter/receiver (e.g., a transceiver) 1366 that can convert signal(s) from analog format to digital format (e.g., analog-to-digital conversion) upon reception, and from digital format to analog (e.g., digital-to-analog conversion) format upon transmission. In addition, receiver/transmitter 1366 can divide a single data stream into multiple, parallel data streams, or perform the reciprocal operation. Coupled to transceiver 1366 is a multiplexer/demultiplexer 1367 that facilitates manipulation of signal in time and/or frequency space. Electronic component 1367 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM), etc. In addition, mux/demux component 1367 can scramble and spread information (e.g., codes) according to substantially any code known in the art; e.g., Hadamard-Walsh codes, Baker codes, Kasami codes, polyphase codes, and so on. A modulator/demodulator 1368 is also a part of operational group 1325, and can modulate information according to multiple modulation techniques, such as frequency modulation, amplitude modulation (e.g., M-ary quadrature amplitude modulation (QAM), with M a positive integer), phase-shift keying (PSK), and the like.

base station 1310 also includes a processor 1345 configured to confer functionality, at least partially, to substantially any electronic component in the base station 1310, in accordance with aspects of the subject disclosure. In particular, processor 1345 can facilitate base station 1310 to implement configuration instructions received through communication platform 1325, which can include storing data in memory 1355. In addition, processor 1345 facilitates base station 1310 to process data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 1345 can manipulate antennas $1369_1$-$1369_N$ to facilitate beamforming or selective radiation pattern formation, which can benefit specific locations (e.g., basement, home office . . . ) covered by base station; and exploit substantially any other advantages associated with smart-antenna technology. Memory 1355 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1355 can store configuration information such as schedules and policies; base station address(es) or geographical indicator(s); access lists (e.g., white lists); license(s) for utilization of add-features for base station 1310, and so forth. In one example, cache component 816 can be implemented in memory 1355.

In embodiment 1300, processor 1345 can be coupled to the memory 1355 in order to store and retrieve information necessary to operate and/or confer functionality to communication platform 1325, broadband network interface 1335 (e.g., a broadband modem), and other operational components (e.g., multimode chipset(s), power supply sources . . . ; not shown) that support base station 1010. The base station 1310 can further include cooperative control component 710, which can include functionality, as more fully described herein, for example, with regard to systems 700. In addition, it is to be noted that the various aspects disclosed in the subject specification can also be implemented through (i) program modules stored in a computer-readable storage medium or memory (e.g., memory 1355) and executed by a processor (e.g., processor 1345), or (ii) other combination(s) of hardware and software, or hardware and firmware.

Figure 14:
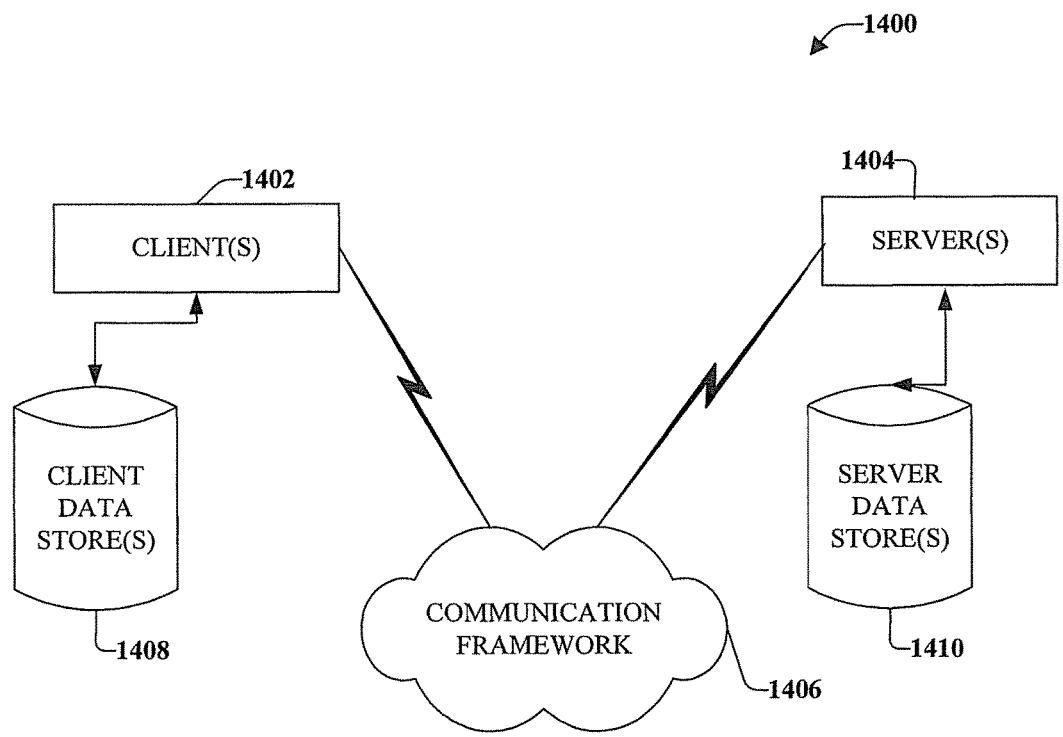
FIG. 14 illustrates an example schematic block diagram of a computing environment in accordance various aspects of this disclosure.

Referring now to FIG. 14, there is illustrated a schematic block diagram of a computing environment 1400 in accordance with this specification. The system 1400 includes one or more client(s) 1402, (e.g., computers, smart phones, tablets, cameras, PDA's). The client(s) 1402 can be hardware and/or software (e.g., threads, processes, computing devices). The client(s) 1402 can house cookie(s) and/or associated contextual information by employing the specification, for example.

The system 1400 also includes one or more server(s) 1404. The server(s) 1404 can also be hardware or hardware in combination with software (e.g., threads, processes, computing devices). The servers 1404 can house threads to perform transformations by employing aspects of this disclosure, for example. One possible communication between a client 1402 and a server 1404 can be in the form of a data packet adapted to be transmitted between two or more computer processes wherein data packets may include coded items. The data packet can include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. In an aspect, communications between client(s) 1402 and network devices (e.g., server(s) 1404) are through wireless channels. In another aspect, communication links between network devices (e.g., servers(s) 1404) can be via wireless and/or wired channels. It is noted that wireless connections between client(s) 1402 and network devices (e.g., server(s) 1404) are described herein, however client(s) 1402 may have other capabilities (e.g., wired communications capabilities). The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

In one implementation, a server 1404 can transfer an encoded file, (e.g., network selection policy, network condition information, etc.), to client 1402. Client 1402 can store the file, decode the file, or transmit the file to another client 1402. It is noted, that a server 1404 can also transfer uncompressed file to a client 1402 and client 1402 can compress the file in accordance with the disclosed subject matter. Likewise, server 1404 can encode information and transmit the information via communication framework 1406 to one or more clients 1402.

Figure 15:
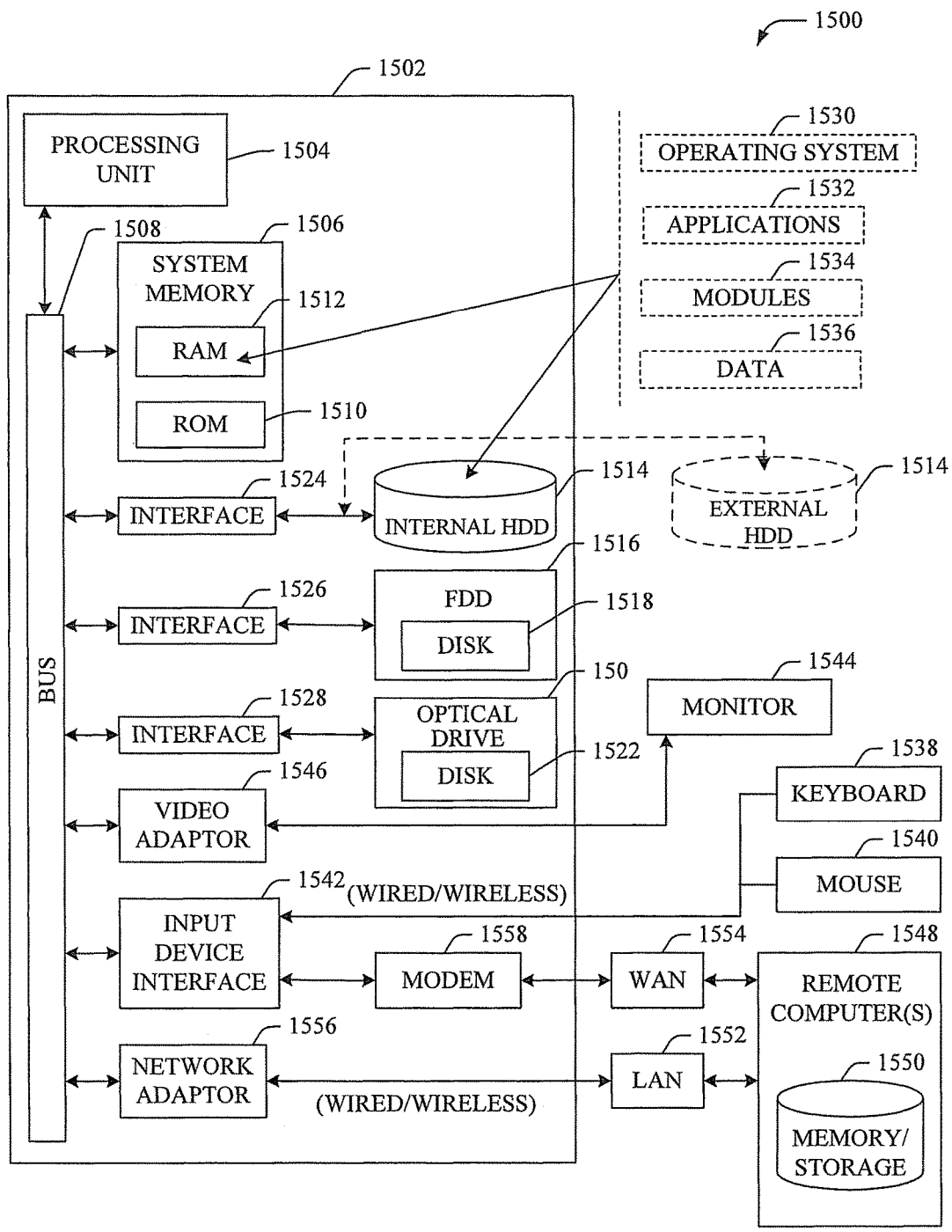
FIG. 15 illustrates a block diagram of a computer operable to execute the disclosed communication architecture.

Referring now to FIG. 15, there is illustrated a block diagram of a computer operable to execute the disclosed communication architecture. In order to provide additional context for various aspects of the subject specification, FIG. 15 and the following discussion are intended to provide a brief, general description of a suitable computing environment 1500 in which the various aspects of the specification can be implemented. While the specification has been described above in the general context of computer-executable instructions that can run on one or more computers, it is noted that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments, including cloud-computing environments, where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically include (and/or facilitate the transmission of) computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media.

With reference again to FIG. 15, the example environment 1500 for implementing various aspects of the specification includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system is stored in a non-volatile memory 1510 such as ROM, erasable programmable read only memory—electrically erasable programmable read only memory, which basic input/output system contains the basic routines that help to transfer information between elements within the computer 1502, such as during startup. The RAM 1512 can also include a high-speed RAM such as static RAM for caching data.

The computer 1502 further includes an internal hard disk drive 1514 (e.g., EIDE, SATA), which internal hard disk drive 1514 can also be configured for external use in a suitable chassis (not shown), a magnetic floppy disk drive 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1594 interface technologies. Other external drive connection technologies are within contemplation of the subject specification.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is noted that the specification can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) can include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network 1552 and/or larger networks, e.g., a wide area network 1554. Such local area network and wide area network networking environments are commonplace in offices and companies, and facilitate enterprise-wide computer networks, such as intranets, all of which can connect to a global communications network, e.g., the Internet.

When used in a local area network networking environment, the computer 1502 is connected to the local network 1552 through a wired and/or wireless communication network interface or adapter 1556. The adapter 1556 can facilitate wired or wireless communication to the local area network 1552, which can also include a wireless access point disposed thereon for communicating with the wireless adapter 1556.

When used in a wide area network environment, the computer 1502 can include a modem 1558, or is connected to a communications server on the wide area network 1554, or has other means for establishing communications over the wide area network 1354, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It is noted that the network connections shown are example and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. In an example embodiment, wireless communications can be facilitated, for example, using Wi-Fi, Bluetooth™, Zigbee, and other 802.XX wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks can operate in the unlicensed 2.4 and 5 GHz radio bands, at an 12 Mbps (802.11a), 54 Mbps (802.11b), or 150 Mbps (802.11n) data rate, for example, or with products that contain both bands (dual band), so the networks can provide real-world performance similar to wired Ethernet networks used in many homes and/or offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It is noted that the memory components, or computer-readable storage media, described herein can be either volatile memory(s) or nonvolatile memory(s), or can include both volatile and nonvolatile memory(s).

By way of illustration, and not limitation, nonvolatile memory(s) can include read only memory (ROM), programmable ROM (PROM), electrically programmable ROM (EPROM), electrically erasable ROM (EEPROM), or flash memory. Volatile memory(s) can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "module," "system," "interface," "platform," "service," "framework," "connector," "controller," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor, coupled to a memory, that executes or facilitates execution of executable components stored at least partly in the memory, the executable components comprising:
   a caching control component configured to:
      select content files for storage in a first cache of a first base station device of a network and a second cache of a second base station device of the network, wherein respective amounts of the content files to store are based on an evaluation of data describing respective popularity metrics of the content files,
      divide the content files into respective segments,
      generate first data representing first portions of the respective segments and second data representing second portions of the respective segments of the content files, wherein the first data comprises a first set of maximum distance separable (MDS) encoded parity bits and the second data comprises a second set of MDS encoded parity bits, and
      store the first data representing first portions of the respective segments in the first cache of the first base station and the second cache of the second base station and the second data representing second portions of the respective segments in a content server, wherein the first portions and the second portions are different portions and are stored as MDS-coded bits; and
   a coordination component configured to:
      receive, from a first mobile device, a first request to access a first segment of a first content file of the content files, and, from a second mobile device, a second request to access a second segment of a second content file of the content files, and
      select a cooperative transmission mode or an interference transmission mode based on a first status of the first request and a second status of the second request,
      wherein during the cooperative transmission mode, the first base station device and the second base station device perform cooperatively and spatially multiplexed transmissions of first cached MDS-coded bits from a set of cached MDS-coded bits of the first segment in response to the first request and second cached MDS-coded bits from a set of cached MDS-coded bits of the second segment in response to the second request, wherein an alignment of the first cached MDS-coded bits and the second cached MDS-coded bits increases a multiple-input multiple-output cooperation probability,
      and wherein during the interference transmission mode, the first base station device transmits a first set of un-cached MDS-coded bits of the first segment, obtained from the content server, in response to the first request and the second base station transmits a second set of un-cached MDS-coded bits, obtained from the content server, in response to the second request, without a cooperation between the first base station and the second base station.

2. The system of claim 1, wherein the caching control component is further configured to:
   determine a first size of the first data and a second size of the second data based on at least one of a popularity metric of the content file or a size of the first cache and the second cache.

3. The system of claim 2, wherein the caching control component is further configured to:
   alter data describing the respective popularity metrics of the content files based on an updated set of data describing the respective popularity metrics of the content files.

4. The system of claim 1, wherein the coordination component is further configured to:
   based on a first determination that the first set of cached MDS-coded bits and the second set of cached MDS-coded bits have not been completely transmitted in response to the first request and the second request, select the cooperative transmission mode; and,
   based on a second determination that the first set of cached MDS-coded bits and the second set of cached MDS-coded bits have been completely transmitted in response to the first request and the second request, select the interference transmission mode.

5. The system of claim 4, wherein the coordination component is further configured to:
   select transmission paths and a number of data streams to be spatially multiplexed by the first base station device and the second base station device, in accordance with the respective contents of the first cache and the second cache with respect to the first content file associated with the first request and the second content file associated with the second request, of signals associated with the first request to access the first segment, and other signals associated with the second request to access the second segment.

6. The system of claim 5, wherein the coordination component is further configured to:
   select the transmission paths based on a first performance criterion of the first base station device and a second performance criterion of the second base station device.

7. The system of claim 5, wherein the coordination component is further configured to:
   select the transmission paths based on characteristics of a first connection of the first base station device and a second connection of the second base station device.

8. The system of claim 1, wherein the coordination component is further configured to:
   select the first base station device based on a first determination that the first data representing the first portions of the respective segments in the first cache of the first base station comprises first request data associated with the first request to access the first segment of the first content file of the content files, wherein the first mobile device associated with the first request to access the first segment is operatively coupled to the first base station device; and select the second base station device based on a second determination that the second data representing the second portions of the respective segments in the second cache of the second base station device comprises second request data associated with the second request to access the second segment of the second content file of the content files, wherein a coverage area of the second base station device serves a location of the first mobile device and the first mobile device is not operatively coupled to the second base station device.

9. The system of claim 8, wherein the coordination component is further configured to:

in response to determining the first cache and the second cache comprise the first request data and the second request data, instruct the first base station device and the second base station device to transmit data to the first mobile device and the second mobile device, wherein the first base station device does not communicate with a third mobile device attached to the second base station device.

10. A method, comprising:

evaluating, by a system comprising a processing device, statistic data representing a statistic associated with access requests for content files;

identifying first segments of the content files for storage in a first cache of a first base station device of a communications network and in a second cache of a second base station device of the communications network and second segments of the content files for storage in a content server, wherein the communications network comprises a group of base station devices including the first base station device and the second base station device;

generating a first set of encoded data that represents first portions of the first segments of the content files and a second set of encoded data that represents second portions of the second segments of the content files, wherein the generating comprises using a maximum distance separable (MDS) coding process;

storing the first set of encoded data in the first cache of the first base station device and the second cache of the second base station, and the second set of encoded data in a content server;

receiving a first signal comprising first request data representing a first request, associated with a first mobile device, for access to a first content file of the content files, and a second signal comprising second request data representing a second request, associated with a second mobile device, for access to a second content file of the content files; and selecting a cooperative transmission mode or an interference transmission mode based on a first status of the first request and a second status of the second request, wherein during the cooperative transmission mode, the first base station device and the second base station device coordinate respective transmissions of the first set of encoded data in response to the first request and the second request, wherein the respective transmissions of the first set of encoded data are aligned, at least in part, and wherein an alignment of respective transmissions of the first set of encoded data increases a multiple-input multiple-output cooperation probability, and wherein during the interference transmission mode, the first base station device transmits a first group of the second set of encoded data, obtained from the content server, in response to the first request, and the second base station device transmits a second group of the second set of encoded data, obtained from the content server, in response to the second request.

11. The method of claim 10, wherein the coordinating transmissions by the first base station device and the second base station device further comprises:

in response to the first request data associated with the first request for access to the first content file, instructing a third base station device of the group of base station devices to retrieve the first set of encoded data, stored in a third cache of the third base station device, via a backhaul connection based in part on a characteristic of a network associated with a backhaul consumption and another characteristic of a coverage of the third base station device.

12. The method of claim 11, further comprising:

in response to a determination that the third base station device retrieved the first set of encoded data, initiating transmission of the first set of encoded data by the third base station device through the cooperative transmission mode.

13. The method of claim 11, further comprising:

determining the other characteristic of the coverage of the third base station device based on measurement data associated with a data rate of a transmission between the third base station device and the mobile device.

14. A computer-readable storage device storing computer-executable instructions that, in response to execution, cause a system comprising a processor to perform operations, comprising:

evaluating statistical data of a communications network that comprises a first base station device and at least a second base station device;

controlling alterations of maximum distance separable (MDS) encoded content of a first cache of the first base station device and a second cache of at least the second base station device based on the statistical data, wherein the first cache and the second cache comprise a same MDS encoded content that is different from content of a content server;

selecting a cooperative transmission mode or an interference transmission mode based on a request for delivery of the MDS encoded content of the first cache and the second cache, and determining, based on the MDS encoded content of the first cache and the second cache, respective transmission paths of a first transmission of the first base station device and a second transmission of at least the second base station device, wherein the respective transmission paths align the MDS encoded content of the first cache and the second cache, wherein during the cooperative transmission mode, the first base station device and at least the second base station device perform cooperatively and spatially multiplexed transmissions of the MDS encoded content of the first cache and the second cache, and wherein an alignment of the MDS encoded content of the first cache and the second cache provides an increased multiple-input multiple-output cooperation, and wherein during the interference transmission mode, the first base station device transmits a first set of un-cached MDS-coded bits, obtained from the content server, and at least the second base station transmits a second set of un-cached MDS-coded bits, obtained from the content server, without a cooperation between the first base station and at least the second base station.

15. The computer-readable storage device of claim 14, wherein the operations further comprise:
receiving a first request for delivery of a first content file from a first user device the communications network and a second request for delivery of a second content file from a second user device in the communications network; and
in response to determining that the MDS encoded content of first cache and the second cache has not been completely transmitted in response to the request for delivery of the first content file and the second content file, coordinating, respective transmissions by the first base station device and at least the second base station device via the cooperative transmission mode.

16. The computer-readable storage device of claim 15, wherein the operations further comprise:
in response to determining that the MDS encoded content of first cache and the second cache has been completely transmitted in response to the request for delivery of the first content file and the second content file,
transmitting, by the first base station device, a first set of content to the first user device, wherein the first base station device receives the first set of content from the content server, and transmitting, by at least the second base station device, a second set of content to the second user device, wherein at least the second base station device receives the second set of content from the content server.

17. The computer-readable storage device of claim 15, wherein the coordinating the respective transmissions further comprises:
coordinating the respective transmissions based on a first characteristic of a first backhaul connection associated with the first base station device and a second characteristic of a second backhaul connection associated with at least the second base station device.

18. The computer-readable storage device of claim 17, wherein the operations further comprise:
based on a determination that the first set of cached MDS-coded bits and the second set of cached MDS-coded bits have not been completely transmitted in response to the first request and the second request, selecting the cooperative transmission mode.

19. The computer-readable storage device of claim 18, wherein the operations further comprise:
based on a determination that the first set of cached MDS-coded bits and the second set of cached MDS-coded bits have been completely transmitted in response to the first request and the second request, selecting the interference transmission mode.

* * * * *

UNITED STATES PATENT AND TRADEMARK OFFICE
CERTIFICATE OF CORRECTION

PATENT NO. : 10,129,356 B2
APPLICATION NO. : 14/542465
DATED : November 13, 2018
INVENTOR(S) : Vincent Kin Nang Lau and An Liu Page 1 of 1

It is certified that error appears in the above-identified patent and that said Letters Patent is hereby corrected as shown below:

In the Claims

At Column 34, Line 14, Claim 18 "17" should be replaced with --15--

At Column 34, Line 21, Claim 19 "18" should be replaced with --15--

Signed and Sealed this
Twentieth Day of August, 2019

Andrei Iancu
*Director of the United States Patent and Trademark Office*